US008914447B2

(12) United States Patent
Griset et al.

(10) Patent No.: US 8,914,447 B2
(45) Date of Patent: Dec. 16, 2014

(54) SYSTEM AND METHOD FOR FEATURE BASED MESSAGE ROUTING IN A DYNAMIC MODULAR SYSTEM ARCHITECTURE

(75) Inventors: Steven Griset, Danville, CA (US); Mark Stephen James White, Hampshire (GB); Michael Timmons, San Jose, CA (US)

(73) Assignee: Sybase 365, Inc., Reston, VA (US)

( * ) Notice: Subject to any disclaimer, the term of this patent is extended or adjusted under 35 U.S.C. 154(b) by 283 days.

(21) Appl. No.: 13/109,161

(22) Filed: May 17, 2011

(65) Prior Publication Data

US 2011/0289164 A1    Nov. 24, 2011

Related U.S. Application Data

(60) Provisional application No. 61/345,758, filed on May 18, 2010.

(51) Int. Cl.
  *G06F 15/16*   (2006.01)
  *H04L 12/58*   (2006.01)

(52) U.S. Cl.
  CPC ............ *H04L 12/5895* (2013.01); *H04L 51/38* (2013.01)
  USPC ........................................................ 709/206

(58) Field of Classification Search
  CPC ........................... H04L 51/38; H04L 12/5895
  USPC ......... 709/204, 206, 227–228, 230–231, 238; 455/445, 466
  See application file for complete search history.

(56) References Cited

U.S. PATENT DOCUMENTS

| 2005/0105561 | A1* | 5/2005 | Kim ............................... 370/503 |
| 2008/0318600 | A1* | 12/2008 | Timmons et al. ............. 455/466 |
| 2009/0113213 | A1* | 4/2009 | Park et al. ...................... 713/189 |
| 2009/0149186 | A1* | 6/2009 | Kokoszka et al. ............. 455/445 |
| 2010/0226488 | A1* | 9/2010 | El Osta ..................... 379/221.14 |
| 2010/0278188 | A1* | 11/2010 | Adachi et al. ................. 370/401 |

FOREIGN PATENT DOCUMENTS

WO    WO 2010132061 A1 * 11/2010 .............. H04L 12/56

* cited by examiner

*Primary Examiner* — Ricky Ngo
*Assistant Examiner* — Kabir Jahangir
(74) *Attorney, Agent, or Firm* — Kenyon & Kenyon LLP

(57) ABSTRACT

A flexible, extensible, and dynamically configurable Advanced IP Messaging Server (AIMS) facility that among other things may leverage various pools of data—including for example routing data, location and presence data, Mobile Subscriber profile data, etc.—to expeditiously process and route, through the use of among other things Feature Tags, a wide range of information including among other things conventional Short Message Service, Multimedia Message Service, IP Multimedia Subsystem, etc. messaging; E-Mail messaging; Instant Messaging communications; Voice Over IP and other (e.g., video conference, etc.) data streams; Session Initiation Protocol-addressed artifacts; etc.

18 Claims, 40 Drawing Sheets

| Type | Version Number | Digest Value | Qualifier | ............. |

802  
Feature Tag

FIG. 8

```
MSs                                                          1600
MSId     Name      CurrentLocationId
-------  --------  -----------------
1001     Mary      2003
  .
  .

Locations
LocationId     MSId    Description              Latitude      Longitude
-----------    -----   ----------------------   ----------    ---------
2001           1001    Home                     φ₁            λ₁
2002           1001    Work - Building 1        φ₂            λ₂
2003           1001    Work - Office            φ₃            λ₃
2004           1001    Work - Conference Room   φ₄            λ₄
2005           1001    School - John            φ₅            λ₅
2006           1001    School - Jane            φ₆            λ₆
2007           1001    Shopping Mall            φ₇            λ₇
2008           1001    Other                    N/A           N/A
  .
  .

Contacts
ContactID      MSId    Description              Value
-----------    -----   ----------------------   -----------------
3001           1001    Home Telephone           703-555-1234
3002           1001    Mobile Telephone (A)     703-555-9876
3003           1001    Mobile Telephone (B)     703-555-8765
3004           1001    Work Telephone           703-555-3456
3005           1001    Personal IM              Mary37
3006           1001    Work IM                  MaryCorp2
3007           1001    Personal E-Mail          Mary37@SomeMailSvc.com
3008           1001    Work E-Mail              Mary.Smith@xyz.com
  .
  .

Associations
AssociationId   LocationId   ContactId   Priority
-------------   ----------   ---------   --------
4001            2001         3001        1
4002            2001         3007        2
4003            2001         3005        3
4004            2003         3004        1
4005            2003         3008        2
4006            2008         3002        1
  .
  .
```

SYSTEM AND METHOD FOR FEATURE BASED MESSAGE ROUTING IN A DYNAMIC MODULAR SYSTEM ARCHITECTURE

This patent application claims the benefit of U.S. Provisional Patent Application Ser. No. 61/345,758, filed on 18 May 2010, which is herein incorporated by reference in its entirety.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application. Object Description: SourceCode.txt, size 27.1 KB, created May 7, 2004, 8:29 am;
Object ID: File No. 1; Object Contents: Source Code.

BACKGROUND

1. Field of the Invention

The present invention relates generally to telecommunications services. More particularly, the present invention relates to capabilities that enhance substantially the value and usefulness of various communication paradigms including, inter alia, Short Message Service (SMS), Multimedia Message Service (MMS), Internet Protocol (IP) Multimedia Subsystem (IMS), Wireless Application Protocol (WAP), Electronic Mail (E-Mail), Instant Messaging (IM), etc.

2. Background of the Invention

As the 'wireless revolution' continues to march forward through various flavors of 2G, 3G, 4G, and beyond, the importance to a Mobile Subscriber (MS)—for example a user of a Wireless Device (WD) that is serviced by possibly inter alia a Wireless Carrier (WC)—of their WD grows substantially. Examples of WDs include, possibly inter alia, mobile telephones, handheld computers, Internet-enabled phones, pagers, radios, TVs, audio devices, car audio (and other) systems, recorders, text-to-speech devices, bar-code scanners, net appliances, mini-browsers, personal data assistants (PDAs), etc.

One consequence of such a growing importance is the resulting ubiquitous nature of WDs—i.e., MSs carry them at almost all times and use them for an ever-increasing range of activities. For example, MSs employ their WDs to, possibly inter alia.

1) Exchange messages with other MSs (e.g., "Let's meet for dinner at 6") through Peer-to-Peer, or P2P, messaging.

2) Secure information (such as, for example, weather updates, travel alerts, news updates, sports scores, etc.), participate in voting initiatives (such as, for example, with the television show American Idol®), interact with social networking sites, etc. through various of the available Application-to-Peer, or A2P, based service offerings.

3) Engage in Mobile Commerce (which, broadly speaking, encompasses the buying and selling of merchant-supplied products, goods, and services through a WD) and Mobile Banking (which, broadly speaking, encompasses performing various banking activities through a WD).

Coincident with the rapid growth of WDs has been the desire of WCs, and other entities within a mobile ecosystem, to offer to MSs a continuing stream of new and interesting products and services that, possibly inter alia, attract new MSs and retain existing MSs, leverage or exploit the continually increasing features and capabilities of new WDs, incrementally increase the volume of messaging traffic (and the revenue that is associated with same) that flows through a mobile ecosystem, etc.

Implementation of the various product/service offerings that were referenced above may raise a host of processing, routing, performance, billing, etc. issues which an existing telecommunication infrastructure, which may have originated during the days of voice-only landline communication and which may have evolved incrementally over time to handle aspects of wireless communication, may be incapable of handling and which, as a consequence of the resulting void, may impact or preclude the delivery of such products or services.

Aspects of the present invention fills the lacuna that was noted above by (1) providing enhanced communication processing capabilities through among other things an Advanced IP Messaging Server (AIMS) facility that among other things may leverage various pools of data (e.g., routing data, location and presence data, MS profile data, etc.) to expeditiously process and route a wide range of information (including conventional SMS, MMS, etc. messaging; Voice Over IP [VoIP] and other data streams; Session Initiation Protocol [SIP]-addressed artifacts; etc.) while (2) addressing, in new and innovatory ways, various of the not insubstantial challenges that are associated with same.

SUMMARY OF THE INVENTION

In one embodiment of the present invention there is provided a server-based method for directing a quanta of data towards a WD of a MS that includes possibly among other things (1) receiving the quanta of data at a gateway, the quanta of data comprising an originating indicia, a destination indicia, and a content, and (2) performing a plurality of processing steps including at least creating an Internal Message Object (IMO), characterizing aspects of the quanta of data, generating one or more Feature Tags (based on at least an indicator of the type of the quanta of data, an indicator of the size of the quanta of data, a version number, the originating indicia, and the destination indicia), and preserving aspects of the Feature Tags in the IMO.

In another embodiment of the present invention there is provided a processor-based system on a server for directing a quanta of data towards a WD of a MS that includes possibly among other things (1) a gateway configured to receive the quanta of data (the quanta of data comprising an originating indicia, a destination indicia, and a content) and (2) workflow modules configured to perform various processing steps including at least creating an IMO, characterizing aspects of the quanta, generating one or more Feature Tags (based on at least an indicator of the type of the quanta of data, an indicator of the size of the quanta of data, a version number, the originating indicia, and the destination indicia), and preserving aspects of same in the IMO.

These and other features of the embodiments of the present invention, along with their attendant advantages, will be more fully appreciated upon a reading of the following detailed description in conjunction with the associated drawings.

BRIEF DESCRIPTION OF THE DRAWINGS

FIG. 8 illustrates a hypothetical Feature Tag that is possible under aspects of the instant invention.

FIG. 16 depicts the hypothetical contents of an exemplary data model.

It will be understood that the drawings depict embodiments of the invention. Variations of these embodiments will be readily apparent to persons skilled in the relevant art(s) based on the teachings contained herein.

DETAILED DESCRIPTION OF THE INVENTION

Figure 22:
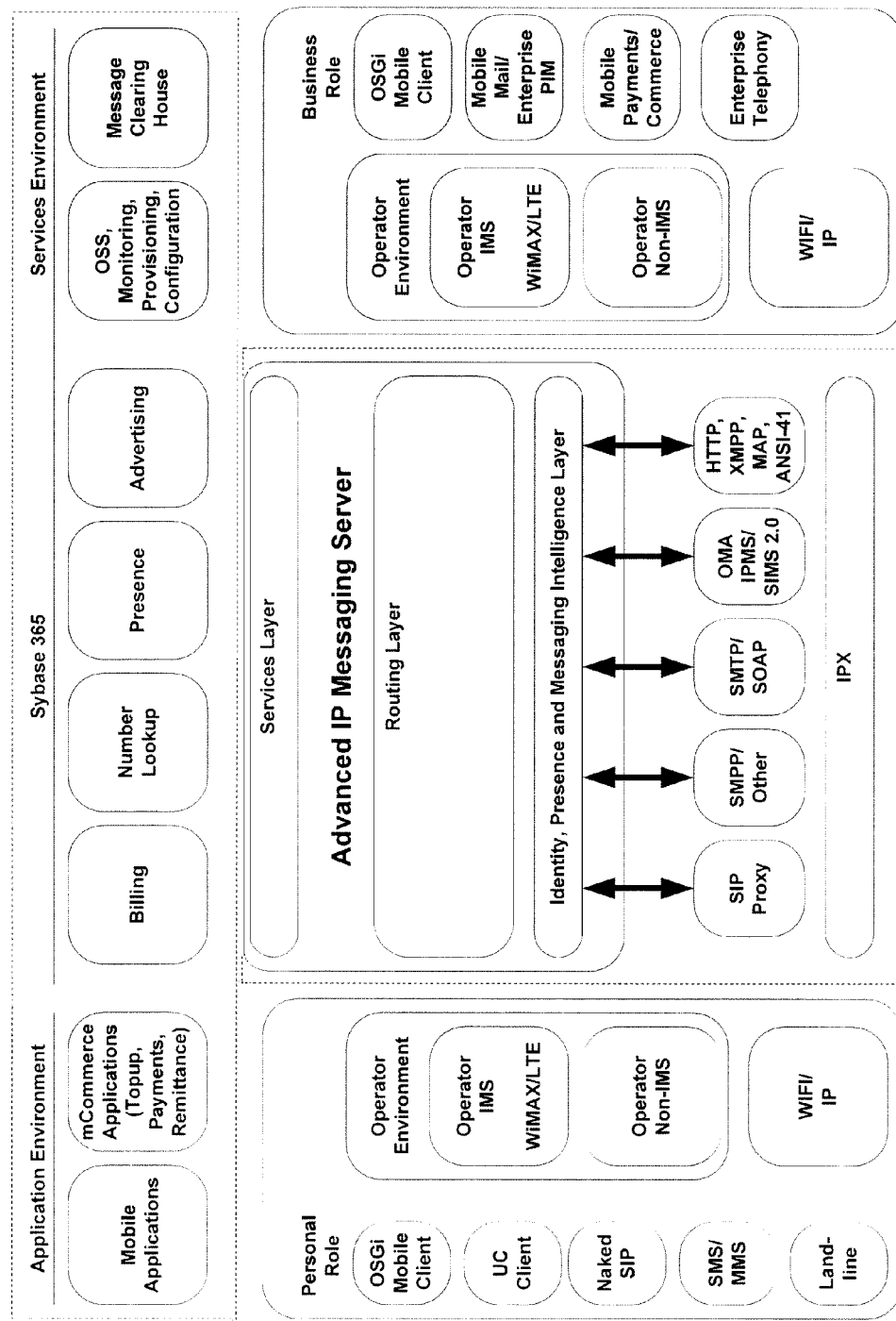
FIG. 22 depicts at a high-level a logical arrangement that is possible under aspects of the present invention.

In the discussion below aspects of AIMS (see for example FIG. 22) are described and illustrated as residing within a centrally-located, full-featured MICV facility. Reference is made to U.S. Pat. No. 7,154,901 entitled "INTERMEDIARY NETWORK SYSTEM AND METHOD FOR FACILITATING MESSAGE EXCHANGE BETWEEN WIRELESS NETWORKS," and its associated continuations, for a discussion of the concept of a MICV, a summary of various of the services/functions/etc. that may be performed by a MICV, and a discussion of the numerous advantages that may arise from same.

In the discussion below aspects of AIMS are described and illustrated as being offered by a Service Provider (SP). A SP may, for example, be realized through any combination of, possibly inter alia, any one or more of (1) an element of a WC, an element of a landline carrier, an element of a MICV, or multiple such elements working together; (2) a Third-Party (3P) such as possibly inter alia a merchant, a Content Provider (CP, such as for example a news organization, an advertising agency, a brand, etc.), or a financial institution; (3) multiple 3P entities working together; (4) a 3P service bureau; etc.

Figure 1:
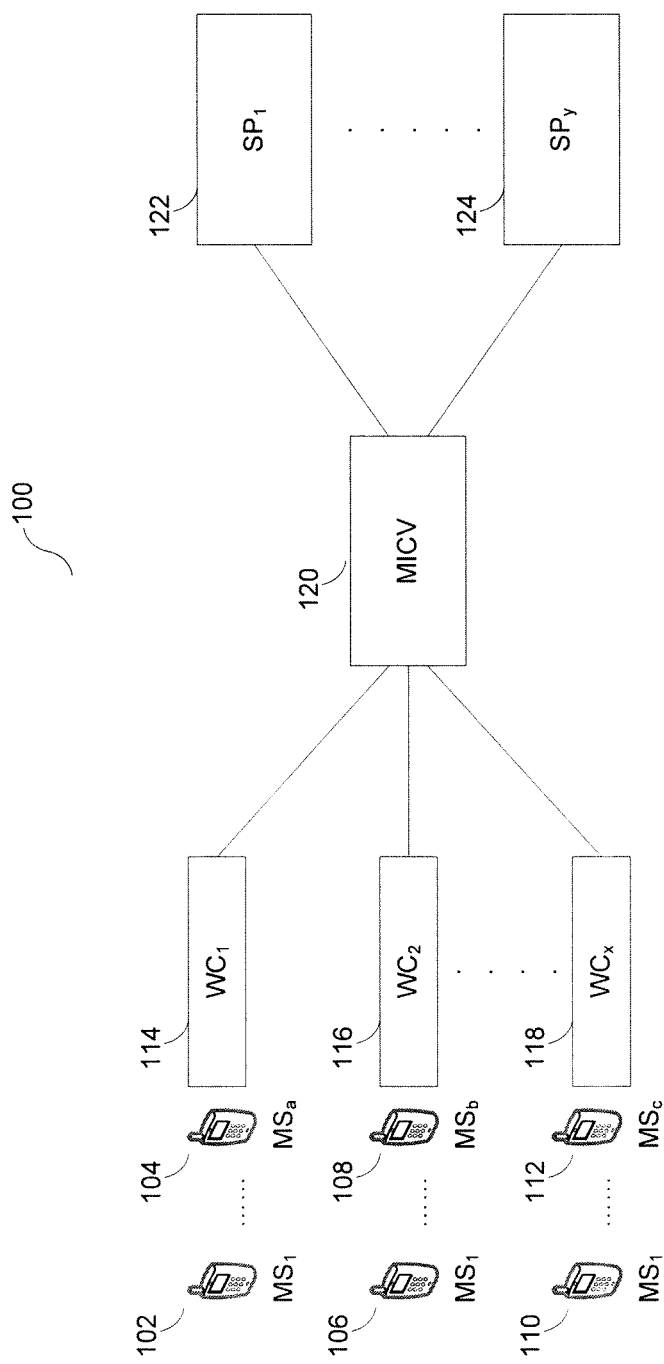
FIG. 1 is a diagrammatic presentation of an exemplary Messaging Inter-Carrier Vendor (MICV).

As illustrated in FIG. 1 and reference numeral 100, under one particular arrangement a MICV 120 is disposed between, possibly inter alia, multiple WCs (WC$_1$ 114, WC$_2$ 116→WC$_x$ 118) and multiple SPs (SP$_1$122→SP$_y$, 124) and thus 'bridges' all of the connected entities. A MICV 120 thus, as one simple example, may offer various routing, formatting, delivery, value-add, etc. capabilities that provide, possibly inter alia:

1) A WC 114→118 (and, by extension, all of the MSs 102→104, 106→108, 110→112 that are serviced by the WC 114→118) with ubiquitous access to a broad universe of SPs 122→124 (and other entities that nay be connected to the MICV), and 2) A SP 122→124 (and other entities that may be connected to the MICV) with ubiquitous access to a broad universe of WCs 114→118 (and, by extension, to all of the MSs 102→104, 106→108, 110→112 that are serviced by the WCs 114→118).

Generally speaking a MICV may have varying degrees of visibility (e.g., access, etc.) to the (MS←→MS, MS←→SP, etc.) messaging traffic:

1) A WC may elect to route just their out-of-network messaging traffic to a MICV. Under this approach the MICV would have visibility (e.g., access, etc.) to just the portion of the WC's messaging traffic that was directed to the MICV by the WC.

2) A WC may elect to route all of their messaging traffic to a MICV. The MICV may, possibly among other things, subsequently return to the WC that portion of the messaging traffic that belongs to (i.e., that is destined for a MS of) the WC. Under this approach the MICV would have visibility (e.g., access, etc.) to all of the WC's messaging traffic.

Figure 2:
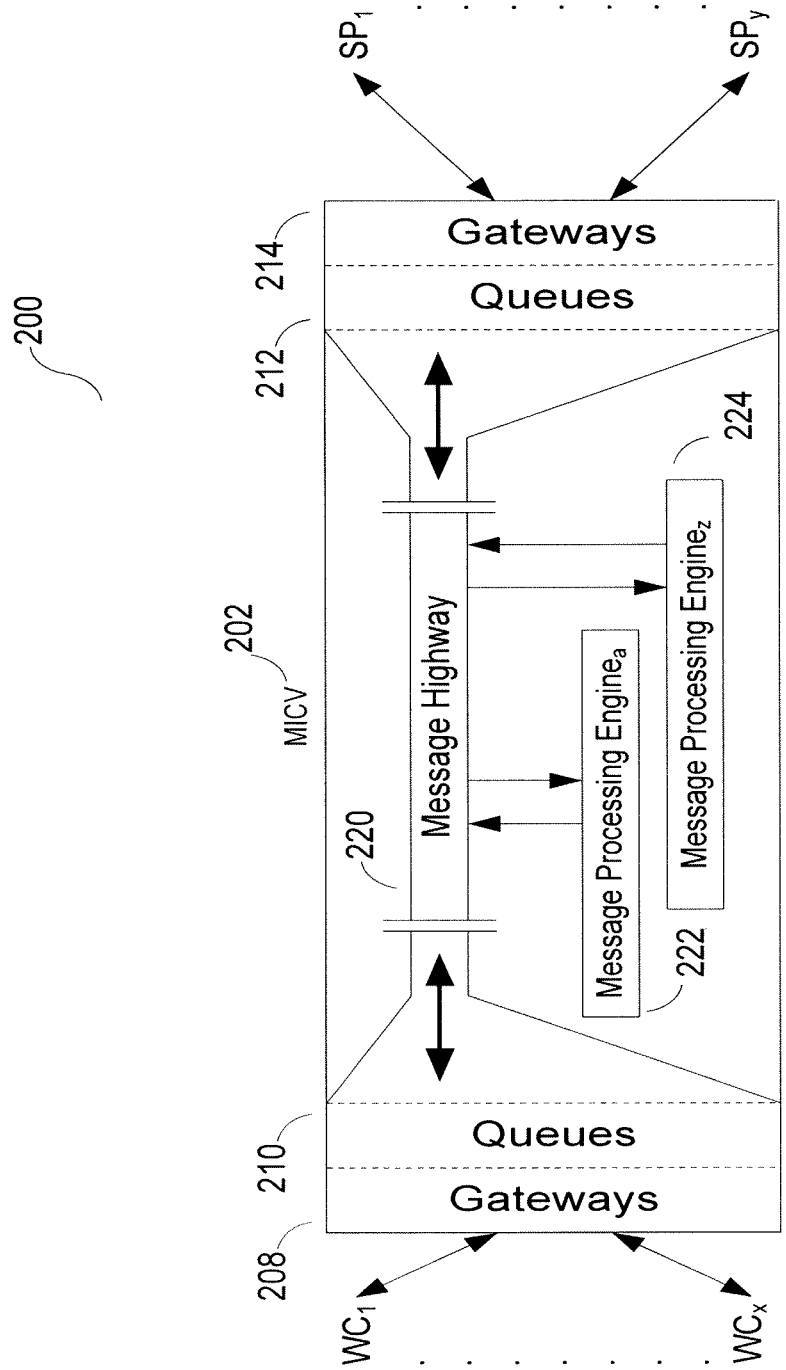
FIG. 2 illustrates various implementation aspects of an exemplary MICV.

For purposes of illustration, FIG. 2 and reference numeral 200 depict a possible logical implementation of aspects of a MICV 202 under one particular arrangement. The figures depict among other things Gateways (208 and 214 that for example provide information/data receipt and dispatch capabilities across possibly inter alia different application-level communication protocols), Queues (210 and 212 that for example provide interim storage and buffering capabilities), a Message Highway (MH 220, that for example provides interconnection capabilities), and MPEs 222→224.

Figure 3:
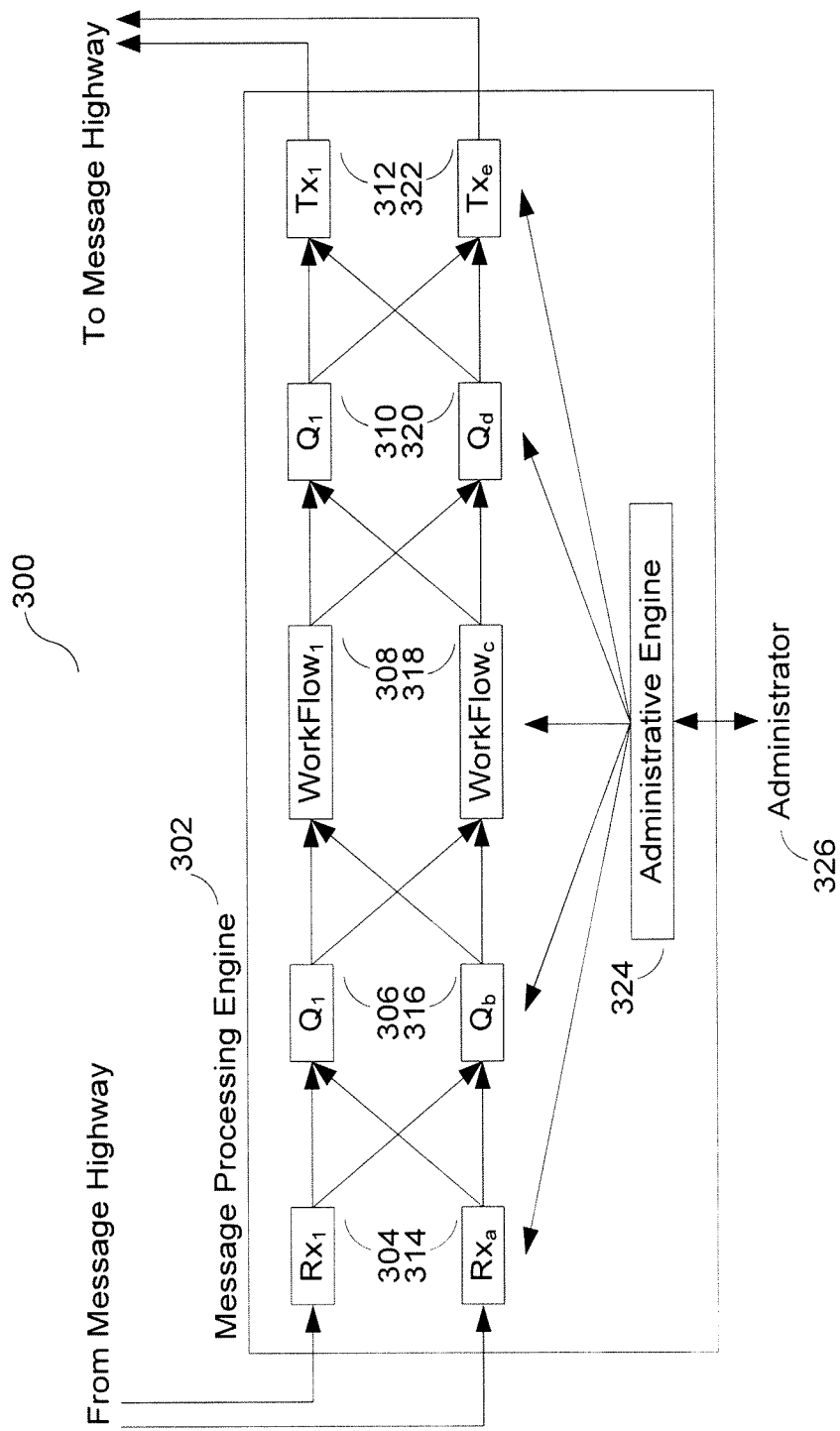
FIG. 3 illustrates various implementation aspects of an exemplary MICV Message Processing Engine (MPE).

FIG. 3 and reference numeral 300 depict a possible logical implementation of aspects of a MPE 302. A MPE may contain several key components—Receivers ($Rx_1$ 304→$Rx_a$ 314 in the diagram), Queues ($Q_1$ 306→$Q_b$ 316 and $Q_1$ 310→$Q_d$ 320 in the diagram), WorkFlows ($WorkFlow_1$ 308→$WorkFlow_c$ 318 in the diagram), Transmitters ($Tx_1$ 312→$Tx_e$ 322 in the diagram), and an Administrator 326. It will be readily apparent to one of ordinary skill in the relevant art that numerous other components are possible within a MPE.

A dynamically updateable set of one or more Receivers ($Rx_1$ 304→$Rx_a$ 314 in the diagram) 'get' messages from a MICV MH and deposit them on an intermediate or temporary Queue ($Q_1$ 306→$Q_b$ 316 in the diagram) for subsequent processing.

A dynamically updateable set of one or more Queues ($Q_1$ 306→$Q_b$ 316 and $Q_1$ 310→$Q_d$ 320 in the diagram) operate as intermediate or temporary buffers for incoming and outgoing messages.

A dynamically updateable set of one or more WorkFlows ($WorkFlow_1$ 308→$WorkFlow_c$ 318 in the diagram) remove incoming messages from an intermediate or temporary Queue ($Q_1$ 306→$Q_b$ 316 in the diagram), perform all of the required operations on the messages, and deposit the processed messages on an intermediate or temporary Queue ($Q_1$ 310→$Q_d$ 320 in the diagram). The WorkFlow component will be described more fully below.

A dynamically updateable set of one or more Transmitters ($Tx_1$ 312→$Tx_e$ 322 in the diagram) remove processed messages from an intermediate or temporary Queue ($Q_1$ 310→$Q_d$ 320 in the diagram) and 'put' the messages on a MICV MH.

An Administrative Engine 324 provides a linkage to all of the different components of a MPE so that a MPE, along with all of the different components of a MPE, may be fully and completely administered or managed 326.

While portions of the discussion below will reference a MICV, it will be readily apparent to one of ordinary skill in the relevant art that numerous other arrangements are equally possible and indeed are fully within the scope of the present invention.

Figure 23:
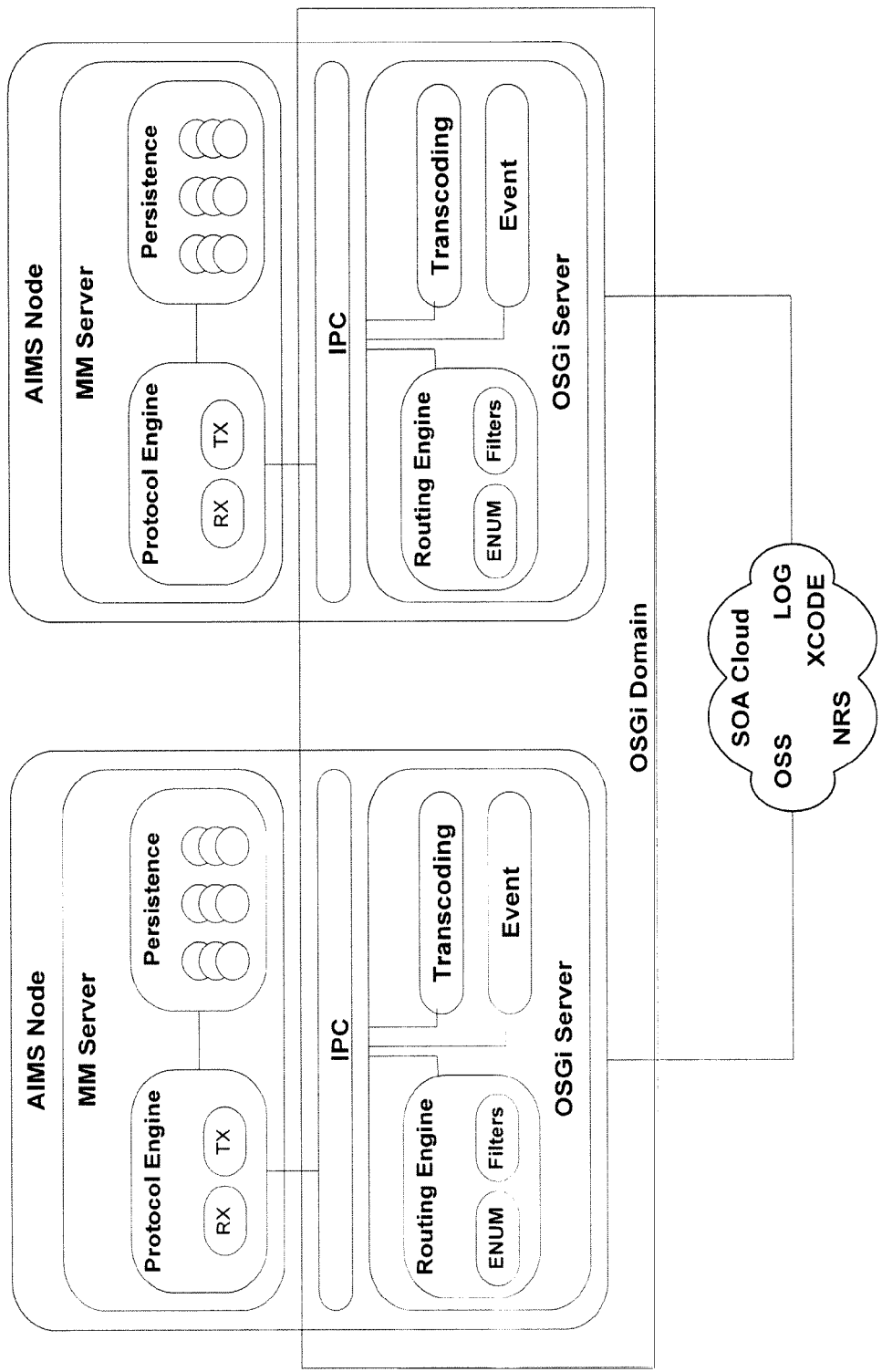
FIGS. 23 and 24 illustrate aspects of a Java-based OSGi dynamic component model.
Figure 24:
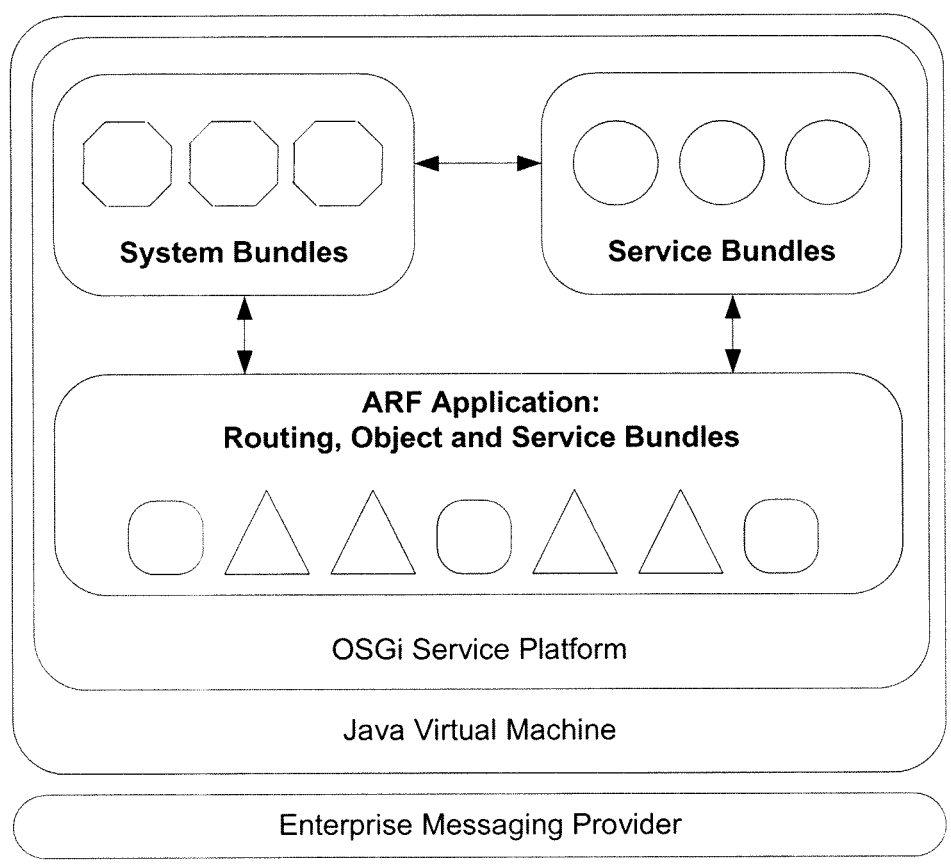

Under one possible implementation paradigm aspects of an AIMS environment may be physically realized through the Java-based OSGi dynamic component model (see for example FIG. 23). Under such an approach various of the aspects of the present invention may be realized through possibly inter alia one or more of the following components (see for example FIG. 24):

1) Process Bundle—e.g., an executable entity that supports some processing activity such as inter alia routing, billing, reporting, etc.

2) Service Bundle—e.g., an aggregation of application-level services that may be realized (implemented) through other bundles.

3) Object Bundle—e.g., a set of Java classes that may be accessed or leveraged by other bundles.

4) System Bundle—e.g., a collection that offers core or key services.

Figure 25:
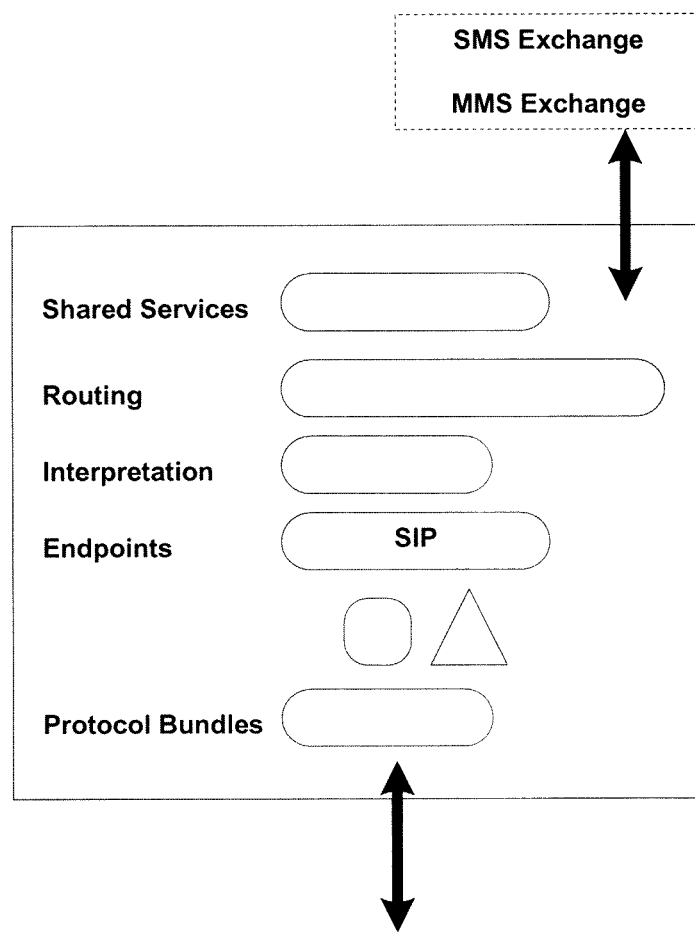
FIG. 25 illustrates the possible interaction/collaboration between a hypothetical collection of bundles.
Figure 26A:
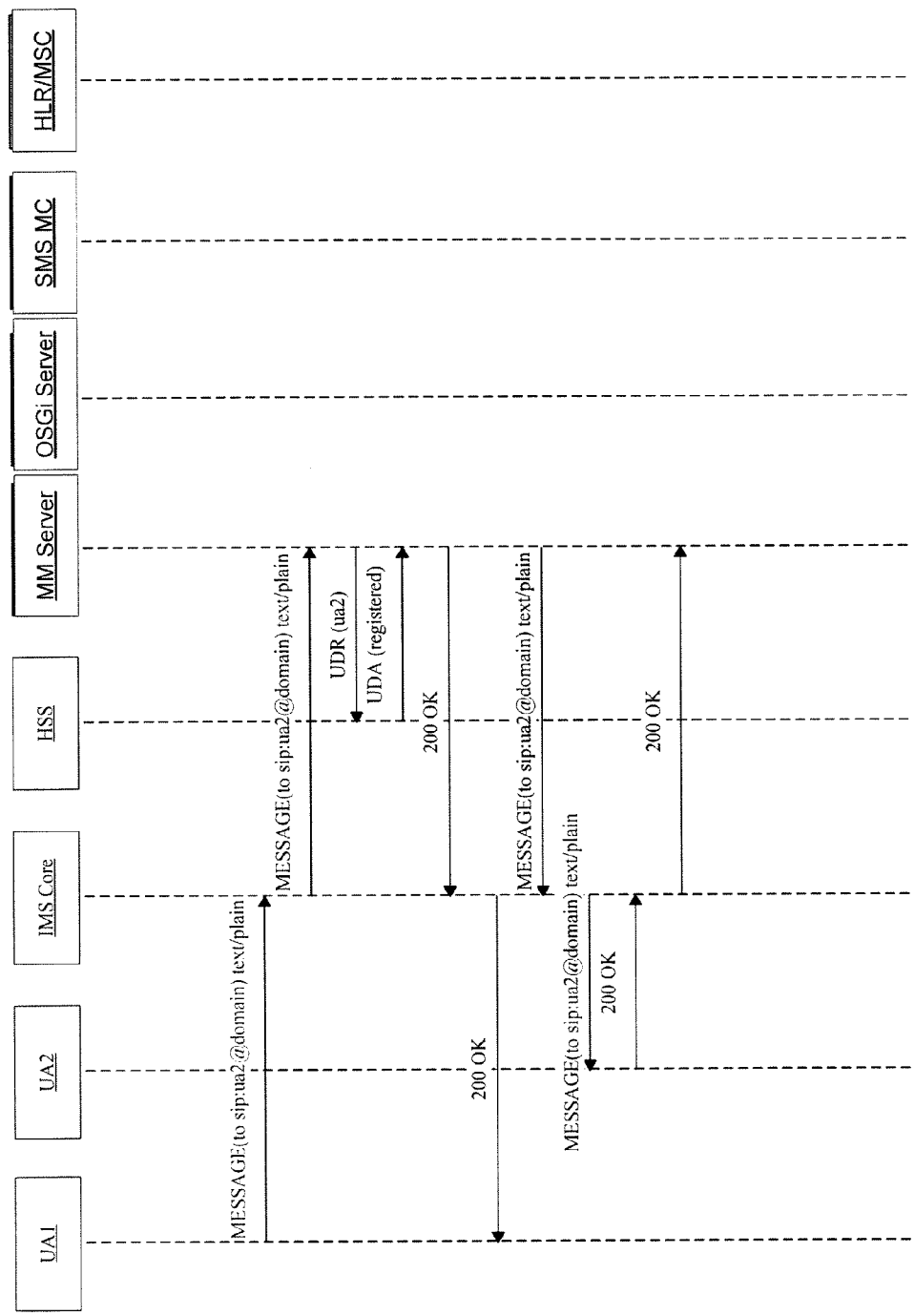
FIGS. 26a through 26d illustrate several of the SMS-based exchanges or interactions that may be possible through aspects of the present invention.
Figure 26B:
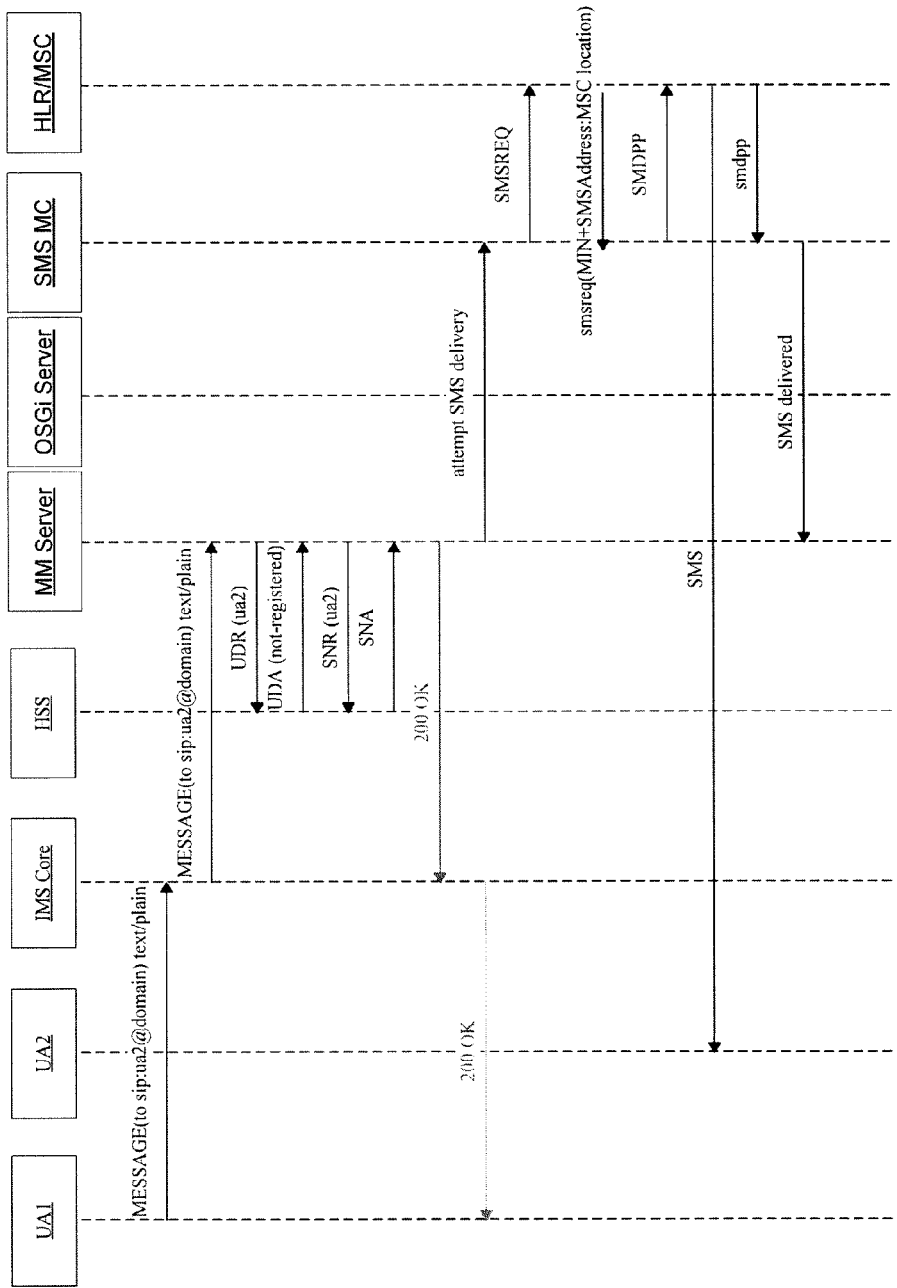
Figure 26C:
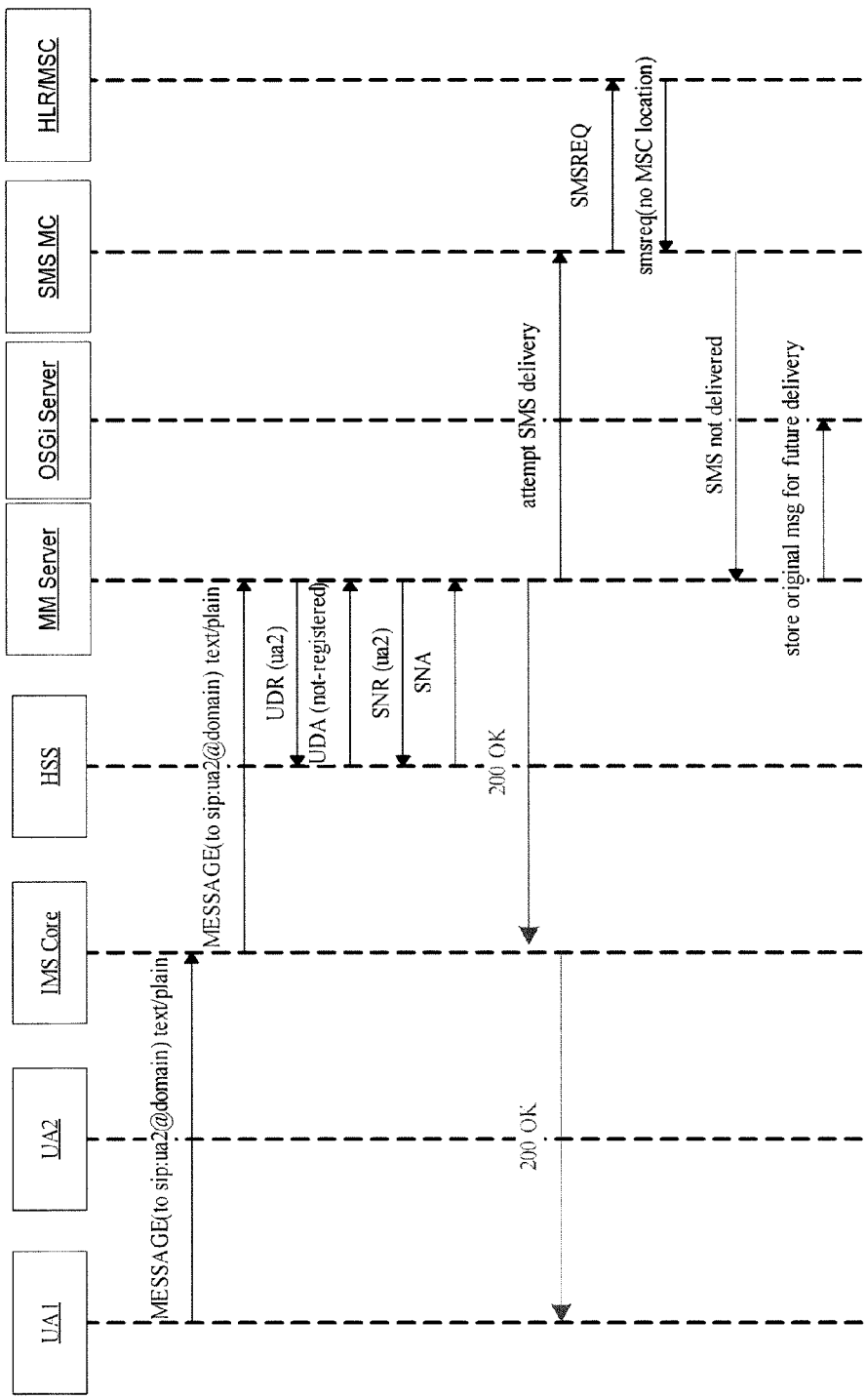
Figure 26D:
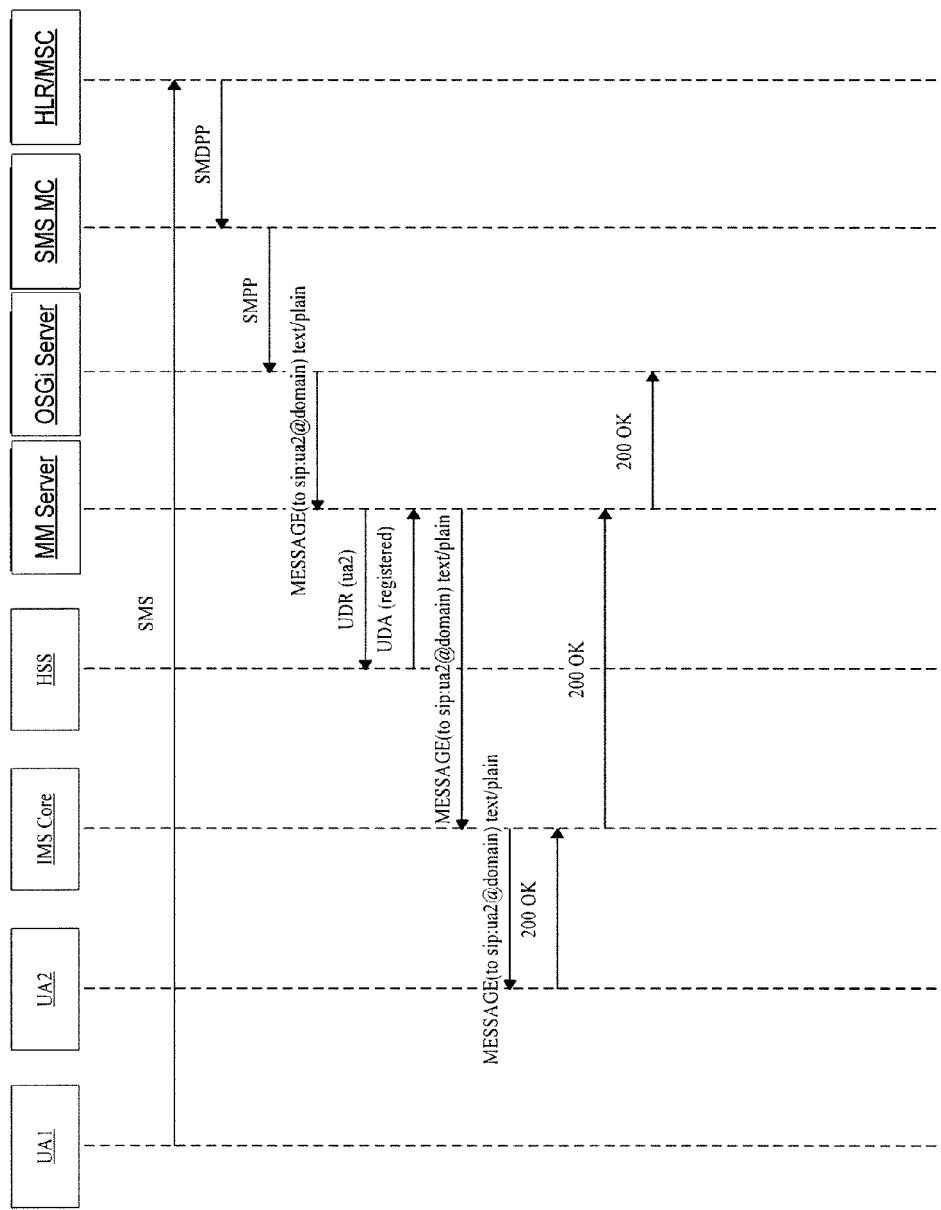
Figure 27A:
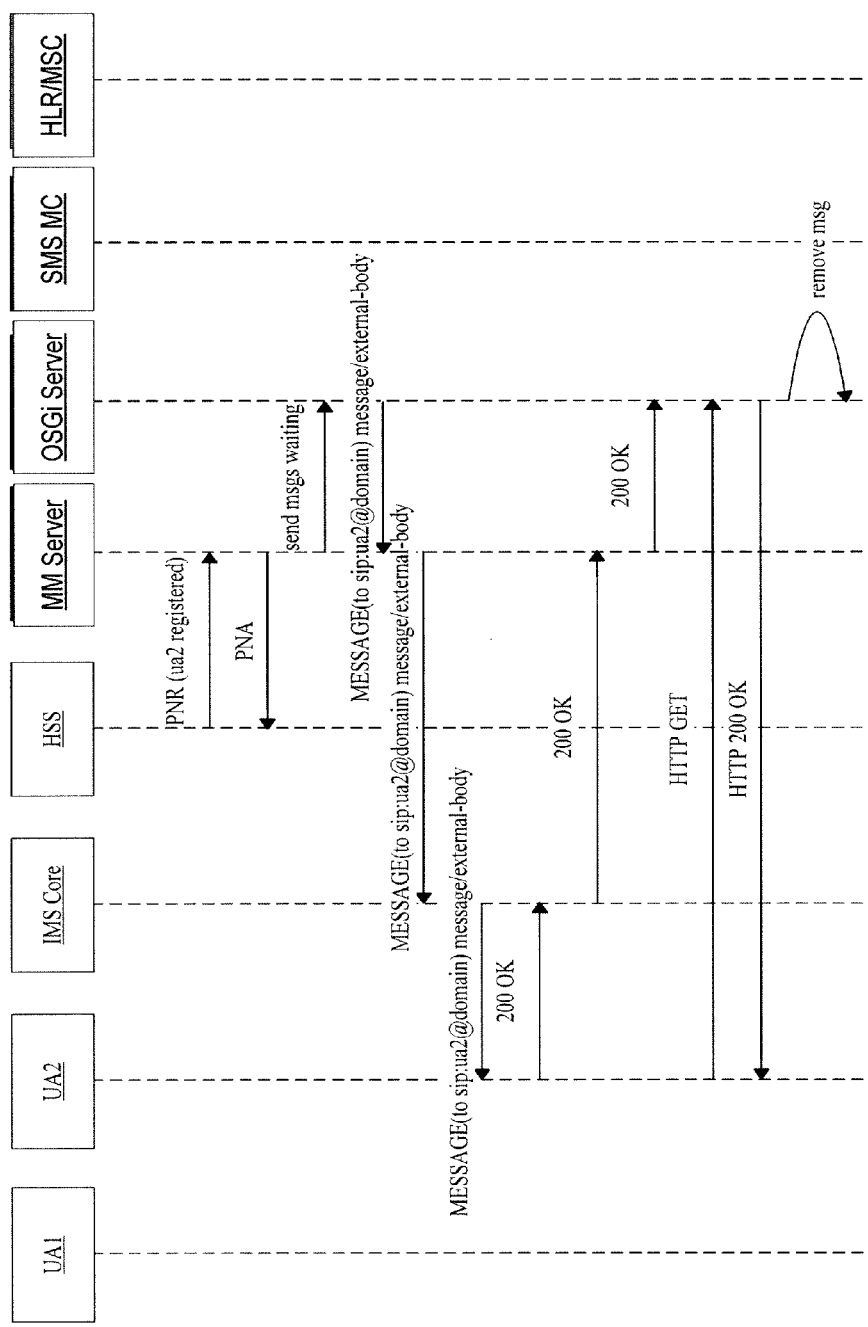
FIGS. 27a through 27e illustrate several of the MMS-based exchanges or interactions that may be possible through aspects of the present invention.
Figure 27B:
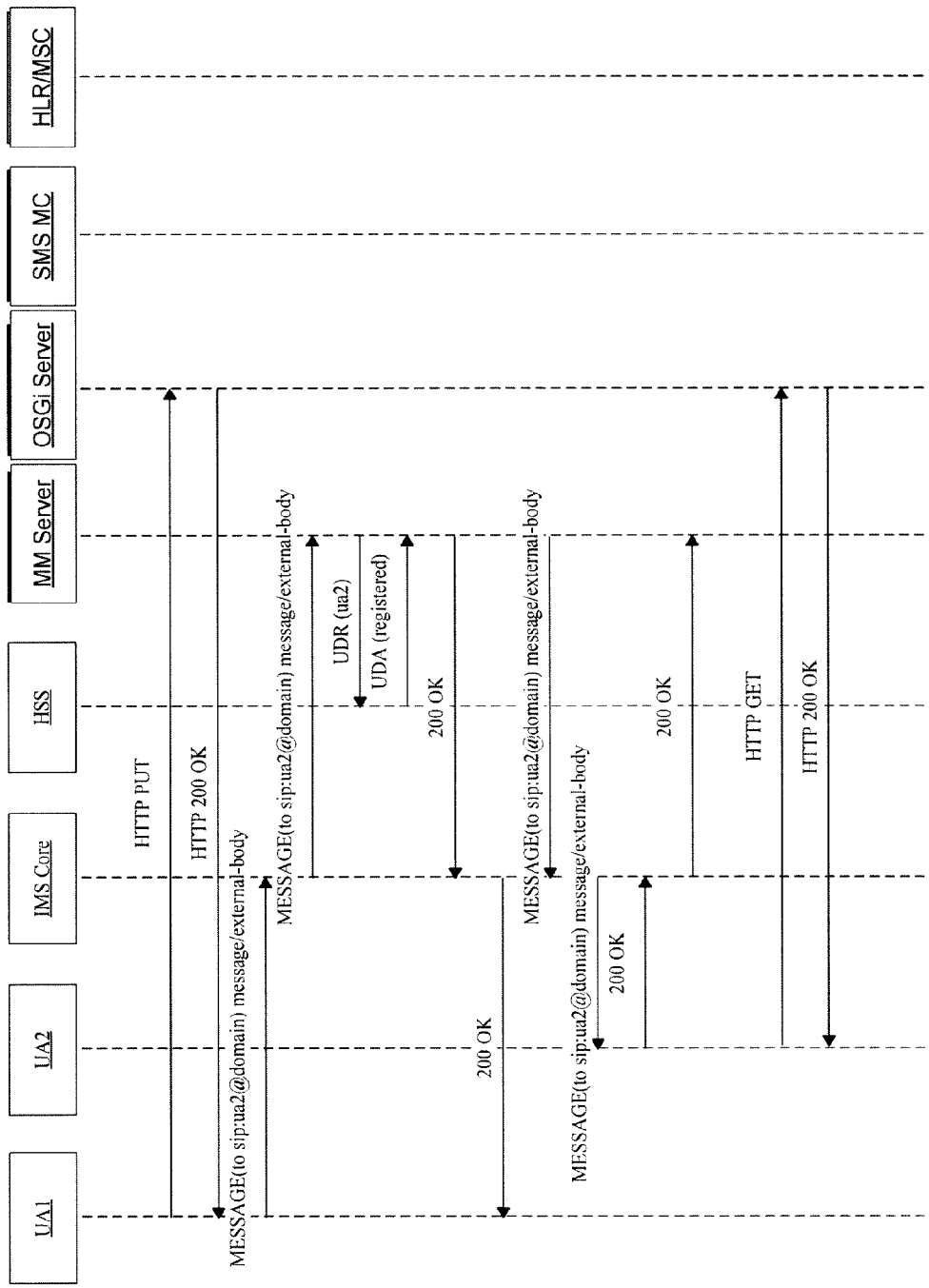
Figure 27C:
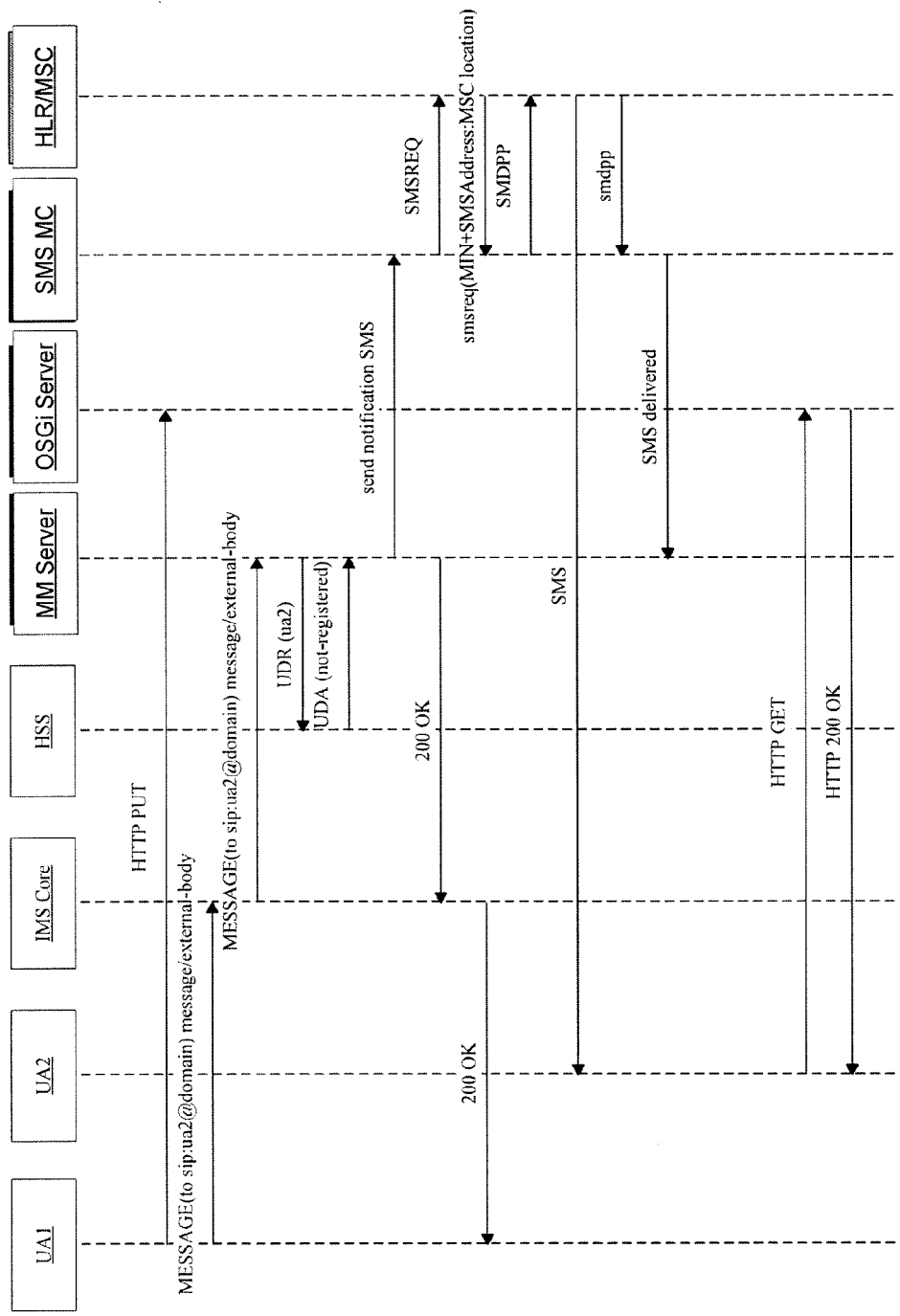
Figure 27D:
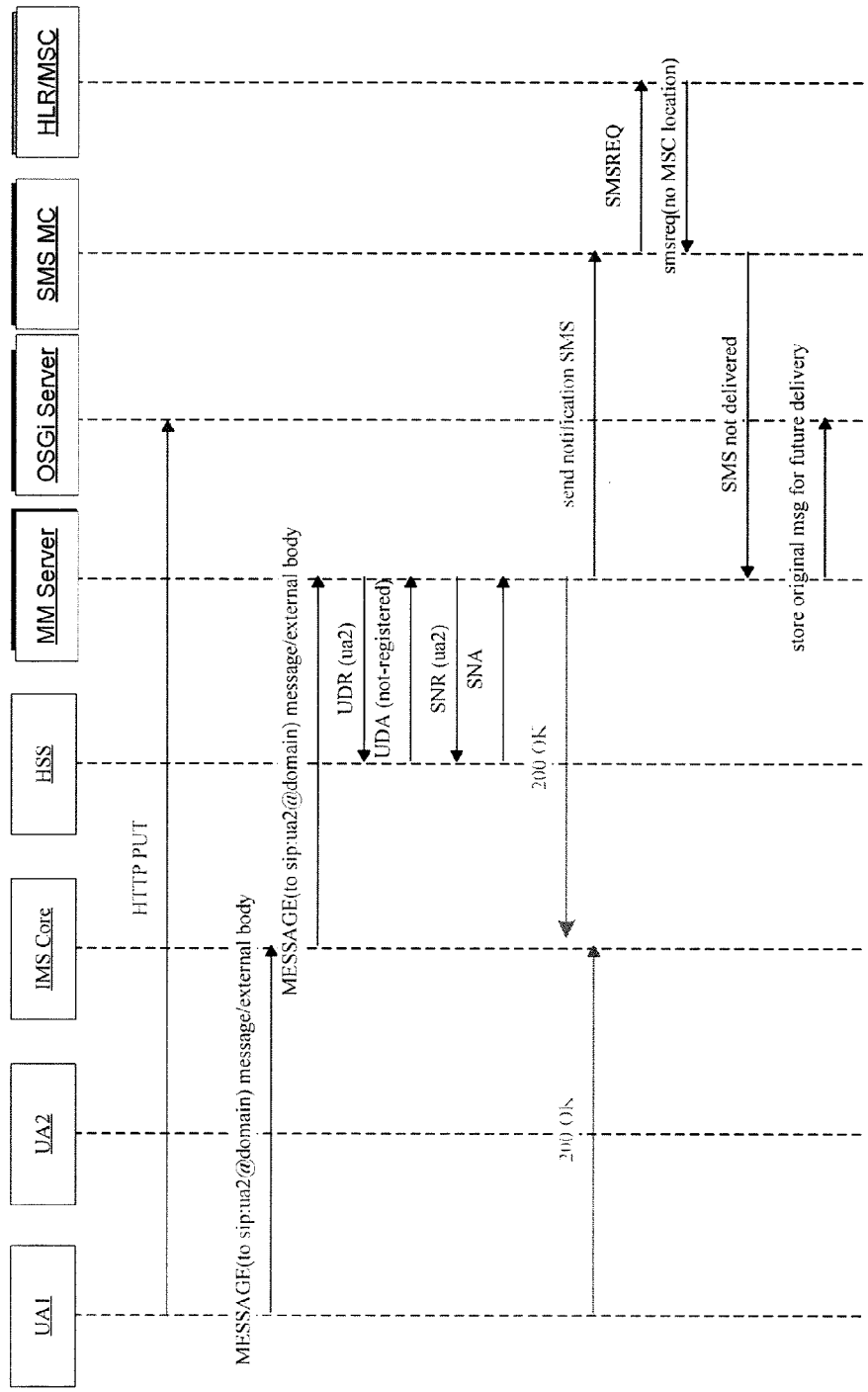
Figure 27E:
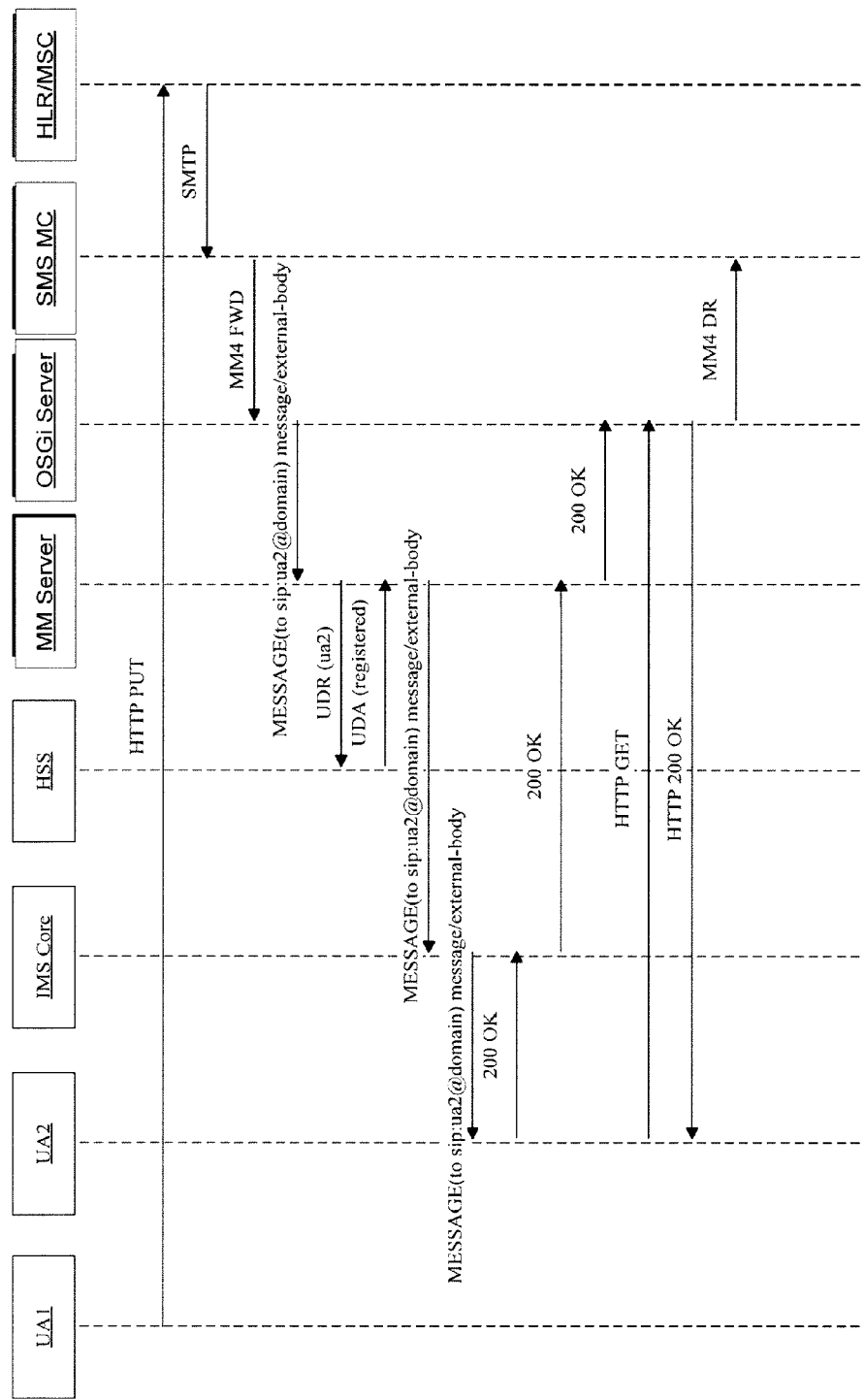

For purposes of illustration, under such a paradigm FIG. 25 illustrates the possible interaction or collaboration between a hypothetical collection of bundles that might take place during the processing of a SIP-based SMS message that is dispatched to a legacy platform (SMS Exchange/MMS Exchange) for final delivery.

Under different implementation paradigms the 'boundary' between various AIMS components may be realized through possibly inter alia queues (e.g., in-memory, via disk drives, etc.), through shared memory regions, through files, through application-level communication protocols, etc. and information may be passed across such boundaries as possibly inter alia proprietary data structures, Java Message Service (JMS) messages or objects, etc.

In portions of the discussion below reference is made to messages that are sent, for example, between a MS and a SP. As set forth below, a given 'message' sent between a MS and a SP may actually comprise a series of steps in which the message is received, forwarded and routed between different entities, including possibly inter alia a MS, a WC, a MICV, and a SP. Thus, unless otherwise indicated, it will be understood that reference to a particular message generally includes that particular message as conveyed at any stage between an origination source, such as for example a MS, and an end receiver, such as for example a SP. As such, reference to a particular message generally includes a series of related communications between, for example, a MS and a WC; a WC and a MICV; a MICV and a SP; etc. The series of related communications may, in general, contain substantially the same information, or information may be added or subtracted in different communications that nevertheless may be generally referred to as a same message. To aid in clarity, a particular message, whether undergoing changes or not, is referred to by different reference numbers at different stages between a source and an endpoint of the message.

Figure 9:
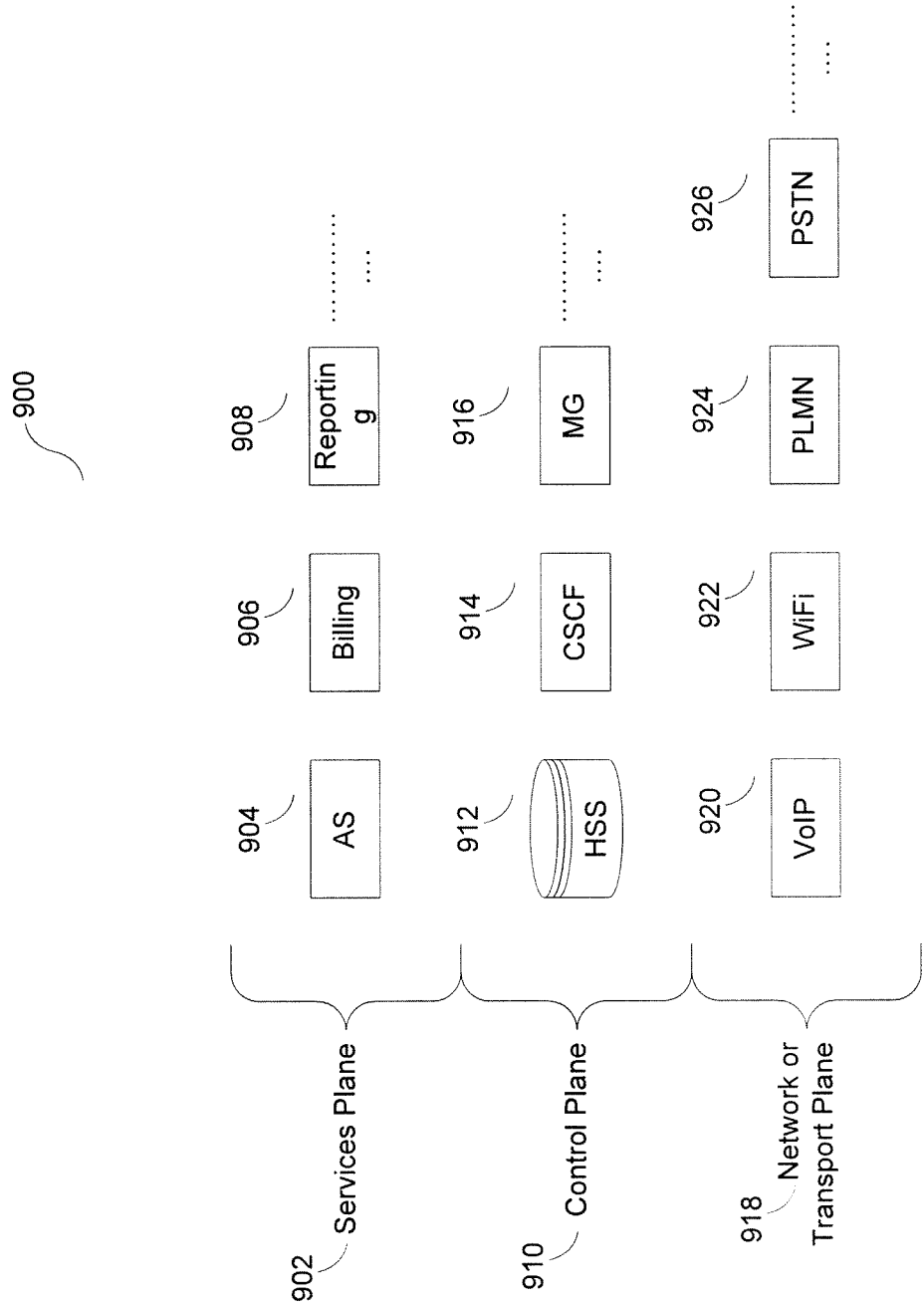
FIG. 9 is a diagrammatic presentation of the three logical IMS planes.

Aspects of AIMS may 'plug into' different layers/levels of legacy, current, and/or future technology and among other things may for example facilitate interoperation between such technologies. For example, looking just at an IMS context:

1) FIG. 9 and reference numeral 900 illustrate IMS' three logical planes:

a) Services Plane 902. For example, one or more Application Server (AS) instances 904, Billing facilities 906, Reporting facilities 908, etc.

b) Control Plane 910. For example, a Home Subscriber Server (HSS) capability 912, a Call Session Control Function (CSCF) capability 914, one or more Media Gateway (MG) instances 916, etc.

c) Network or Transport Plane 918. Support, interfaces, etc. for, possibly inter alia, VoIP 920, WiFi 922, Public Land Mobile Network (PLMN) 924, Public Switched Telephone Network (PSTN) 926, etc.

Figure 10:
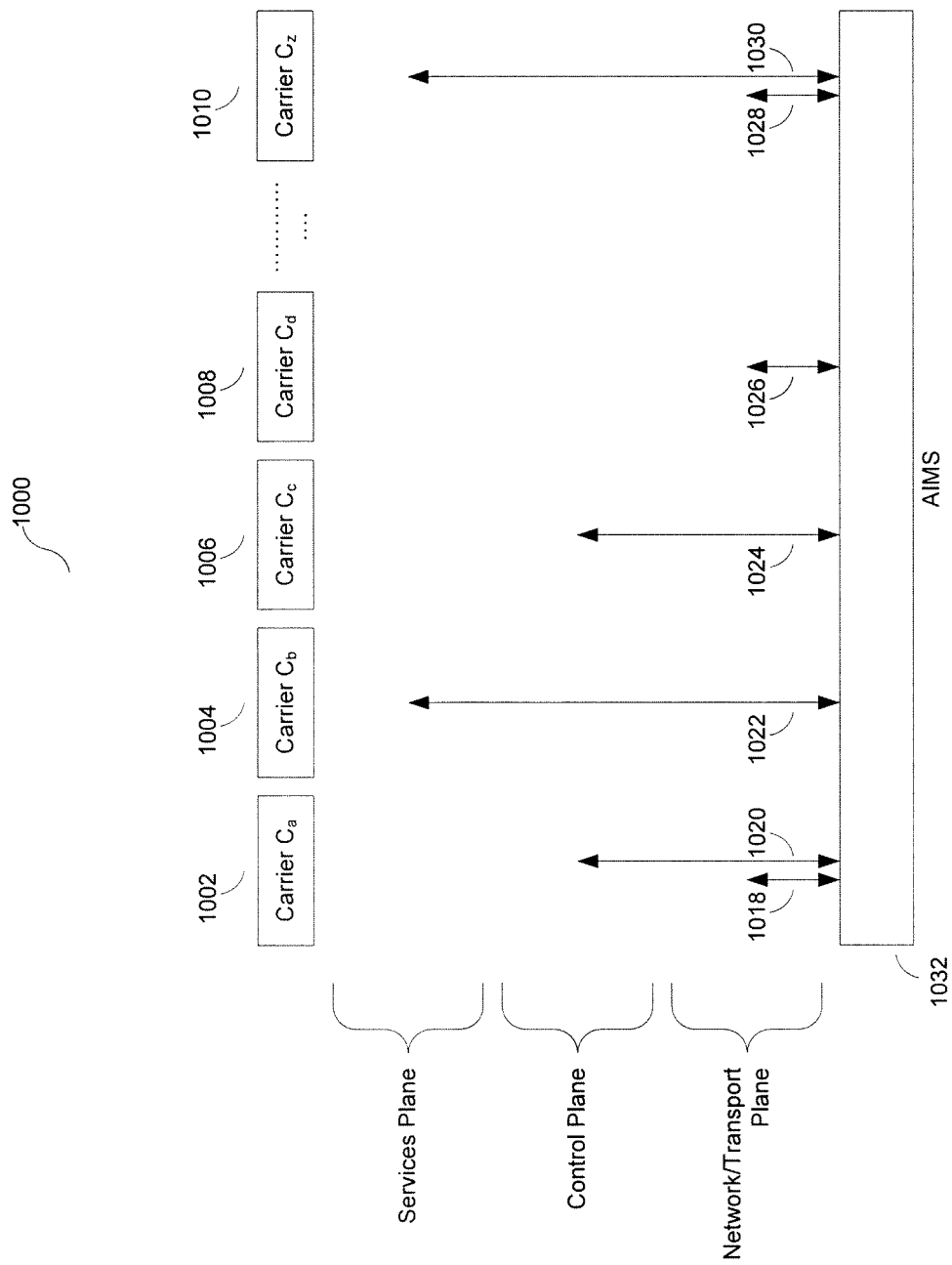
FIG. 10 illustrates exemplary logical connections of multiple carriers that is possible under aspects of the instant invention.

2) FIG. 10 and reference numeral 1000 depict how the different functional elements of an entity (e.g., carriers such as $C_a$ 1002→$C_z$ 1010, etc.) within an IMS ecosystem may plug in to AIMS' single access/connection point 1032—e.g., elements of carrier Ca's 1002 Control Plane and Network or Transport Plane may plug in to AIMS' single access/connection point 1018→1020, elements of carrier Cb's 1004 Services Plane may plug into AIMS' single access/connection point 1022. Similar access points may be realized at 1024→1030.

Figure 11:
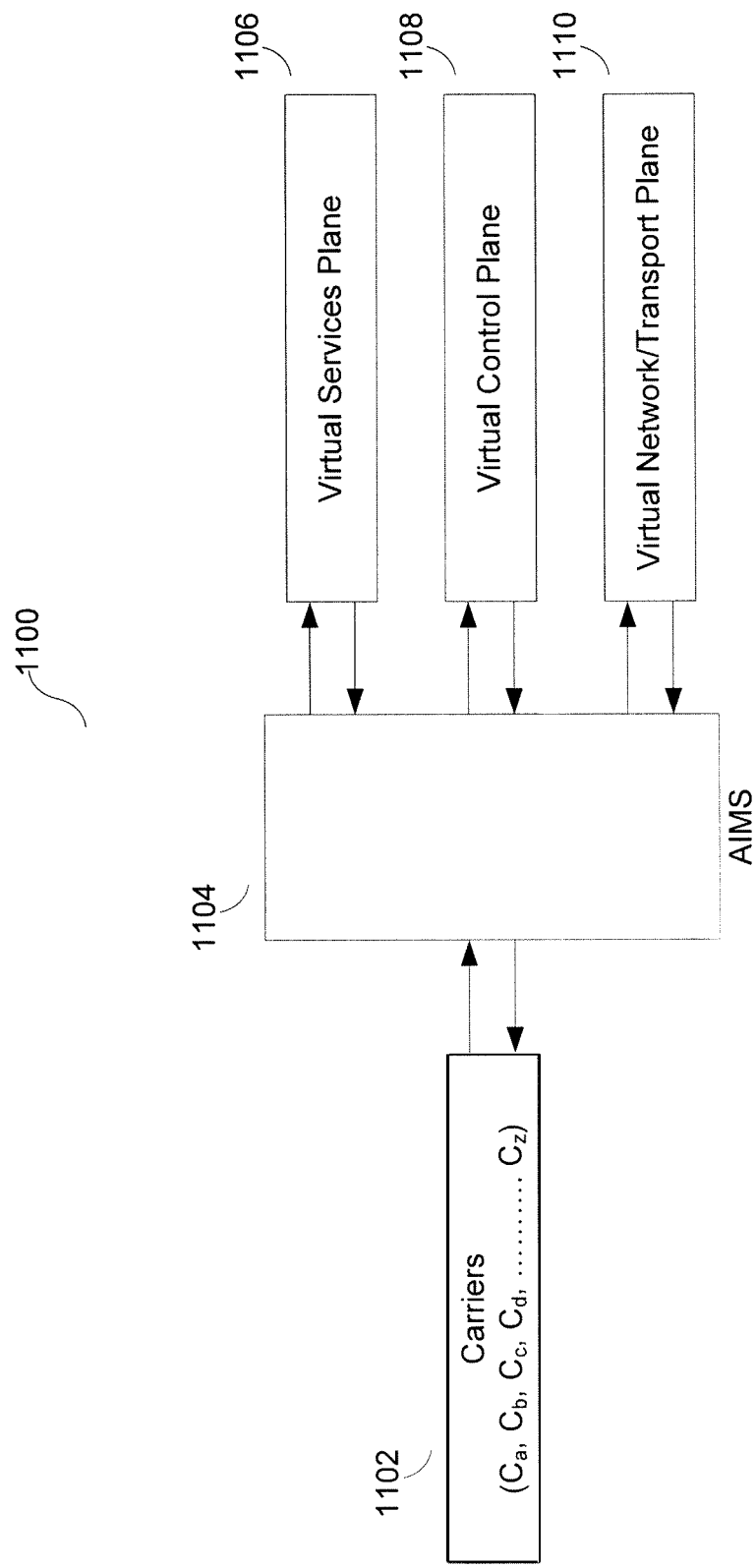
FIG. 11 is a diagrammatic presentation of the virtual implementation of the three logical IMS planes within aspects of the present invention.

3) FIG. 11 and reference numeral 1100 illustrate how the single access/connection point 1104 serves much like a façade, behind which connected entities (e.g., carriers such as $C_a \rightarrow C_z$ 1102, etc.) may access one or more of the virtual implementations of IMS' logical planes 1106→1110.

Thus, for example, as a carrier's environment grows and changes, as a carrier's business needs and models change and evolve, as a carrier deploys new service offerings, etc. it can, possibly among other things, plug into (and thus take advantage of the features and functions that are offered by) different combinations of the virtual implementations of IMS' logical planes all through the single access/communication point.

Additionally, placing the virtual planes behind a single façade allows for, possibly among other things, ongoing and dynamic changes, updates, etc. to the physical implementation of a plane without any impact on, or interruptions to, any of the connected entities.

Figure 21:
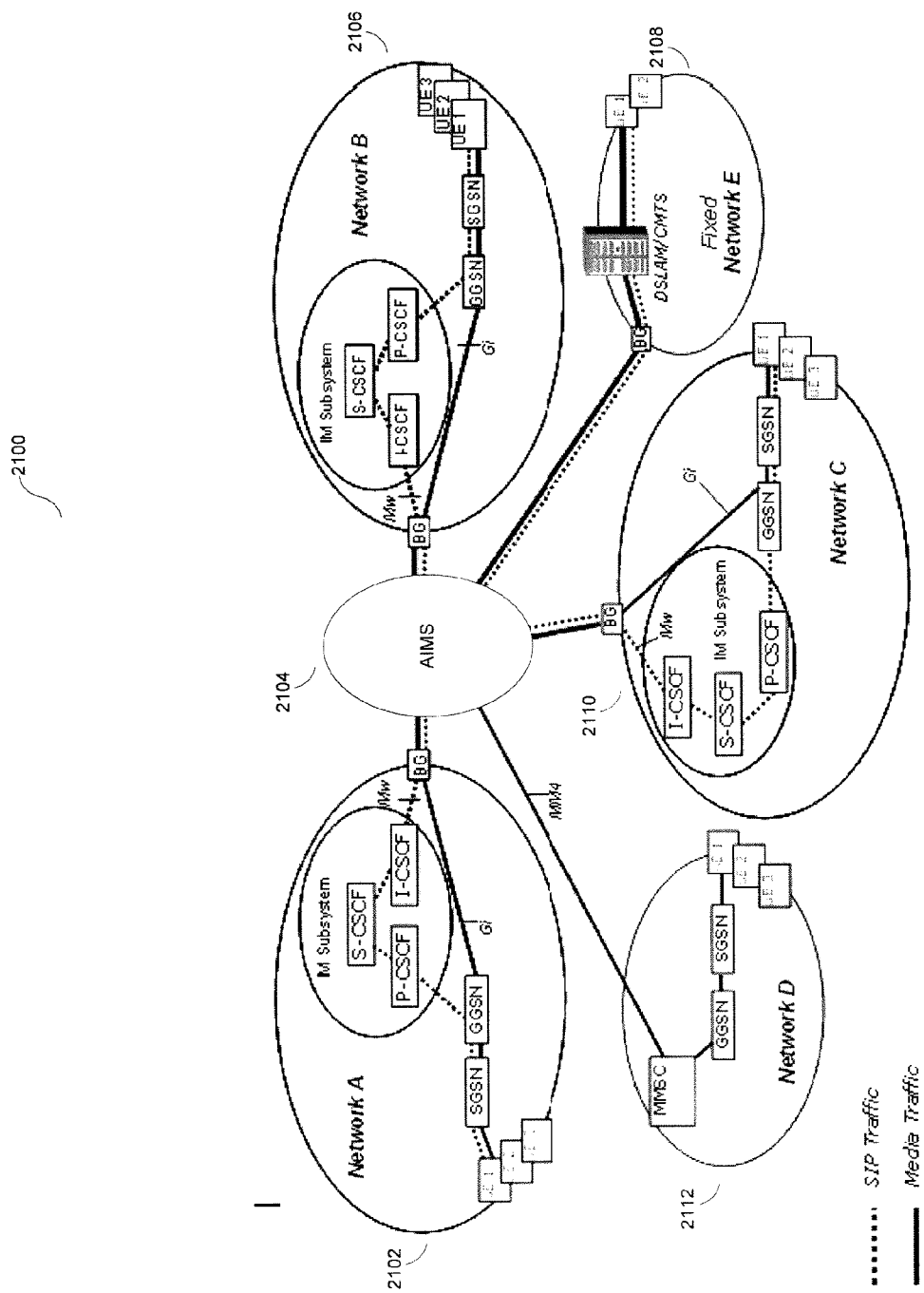
FIG. 21 illustrates one particular IMS-centric arrangement that is possible through aspects of the present invention.

4) FIG. 21 and reference numeral 2100 depict one particular IMS-centric arrangement that is possible through aspects of the present invention—Networks A 2102, B 2106, and C 2110 represent hypothetical IMS-enabled or IMS-capable carriers; Network D 2112 represents a hypothetical non-IMS-enabled carrier that offers, possibly inter alia, MMS services; and Network E 2108 represents a hypothetical fixed (e.g., landline) carrier that offers, possibly inter alia, Digital Subscriber Line (DSL) services. AIMS 2104 may among other things tie together the different (disparate, natively incompatible, etc.) environments. The depicted arrangement is illustrative only and it will be readily apparent to one of ordinary skill in the relevant art that numerous other arrangements are easily possible and indeed are fully within the scope of the present invention.

Central to the operation of AIMS is the unit of information within AIMS that is received, manipulated or otherwise operated on, dispatched, etc. Unlike prior environments that might operate just on, and thus potentially be limited just to, a SMS message or a MMS message, the unit of information within AIMS is a more general quanta of data. Accordingly AIMS is natively capable of operating on inter alia an SMS message, a MMS message, an IMS message, an E-Mail message, a VoIP data stream, IM data, a video conference data stream, etc.

Figure 13:
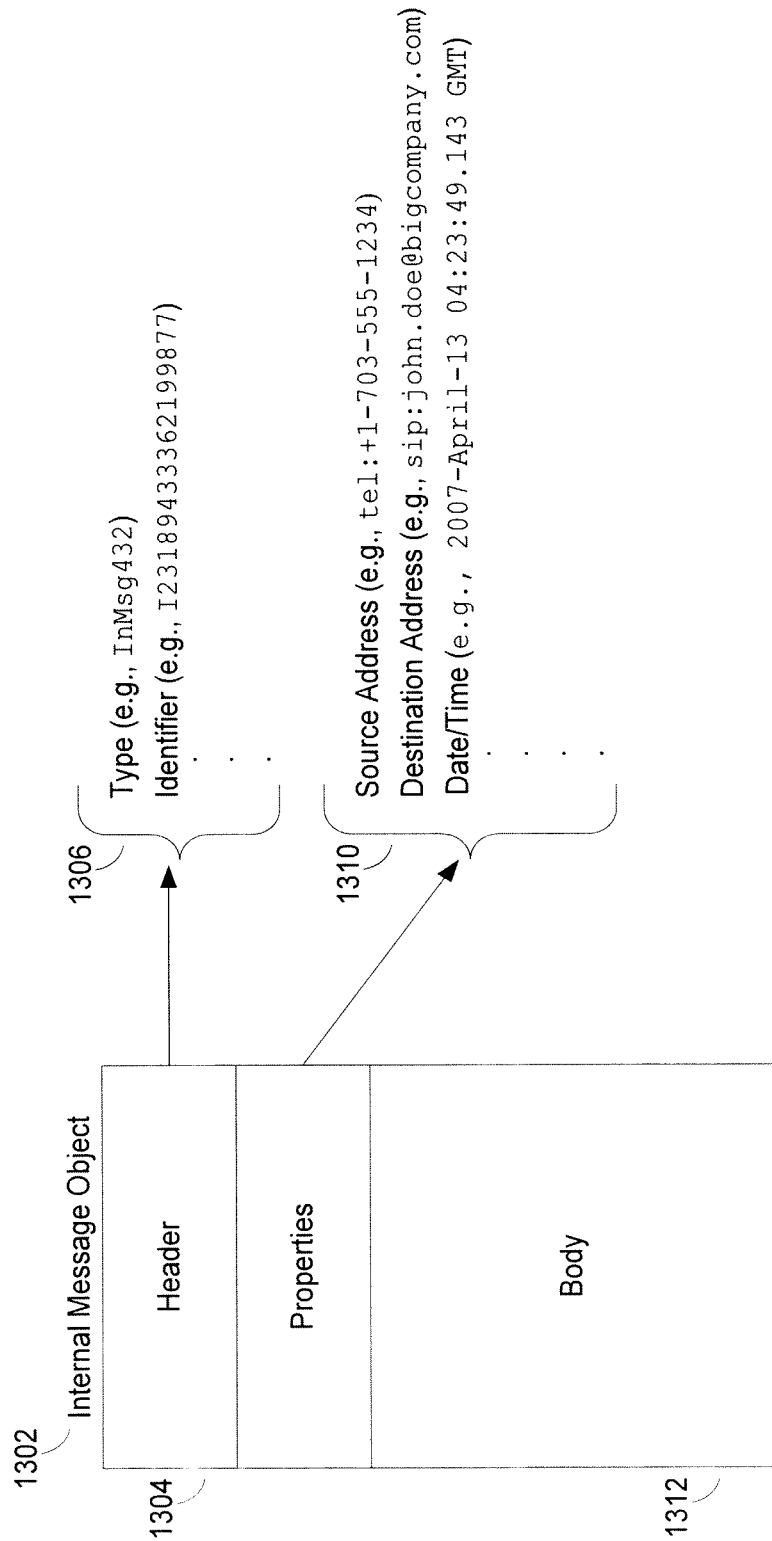
FIG. 13 illustrates aspects of an exemplary IMO.
Figure 20:
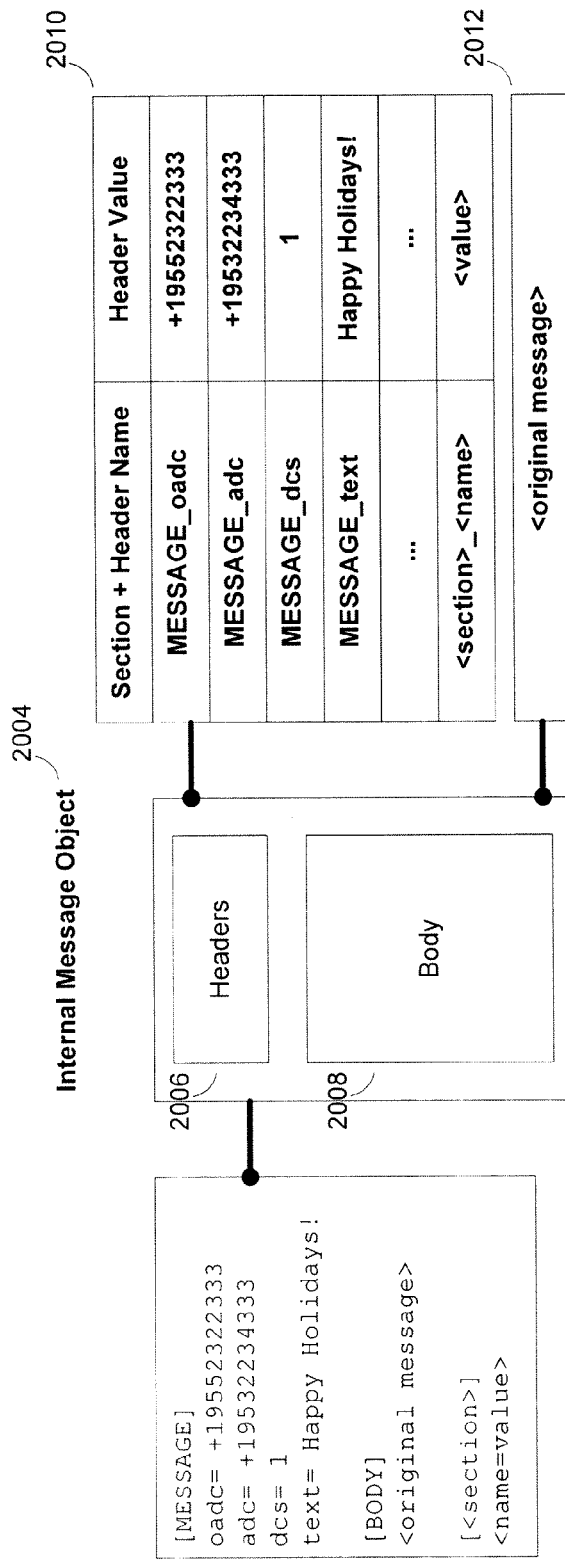
FIG. 20 illustrates aspects of an exemplary IMO.

Within AIMS a flexible, extensible, and dynamically configurable IMO (see for example FIG. 13 and FIG. 20) may be employed as an internal representation of a received quanta of data. An IMO (1302 and 2004) may logically contain possibly inter alia one or more headers (1304 and 2006), a body (1312 and 2008), etc. within which for example aspects of a received quanta of data may be preserved (1306→1310 and 2010→2012). An IMO may physically be realized through any combination of possibly inter alia proprietary data structures, JMS messages or objects, flat files, database entries, in-memory constructs, etc.

Figure 4:
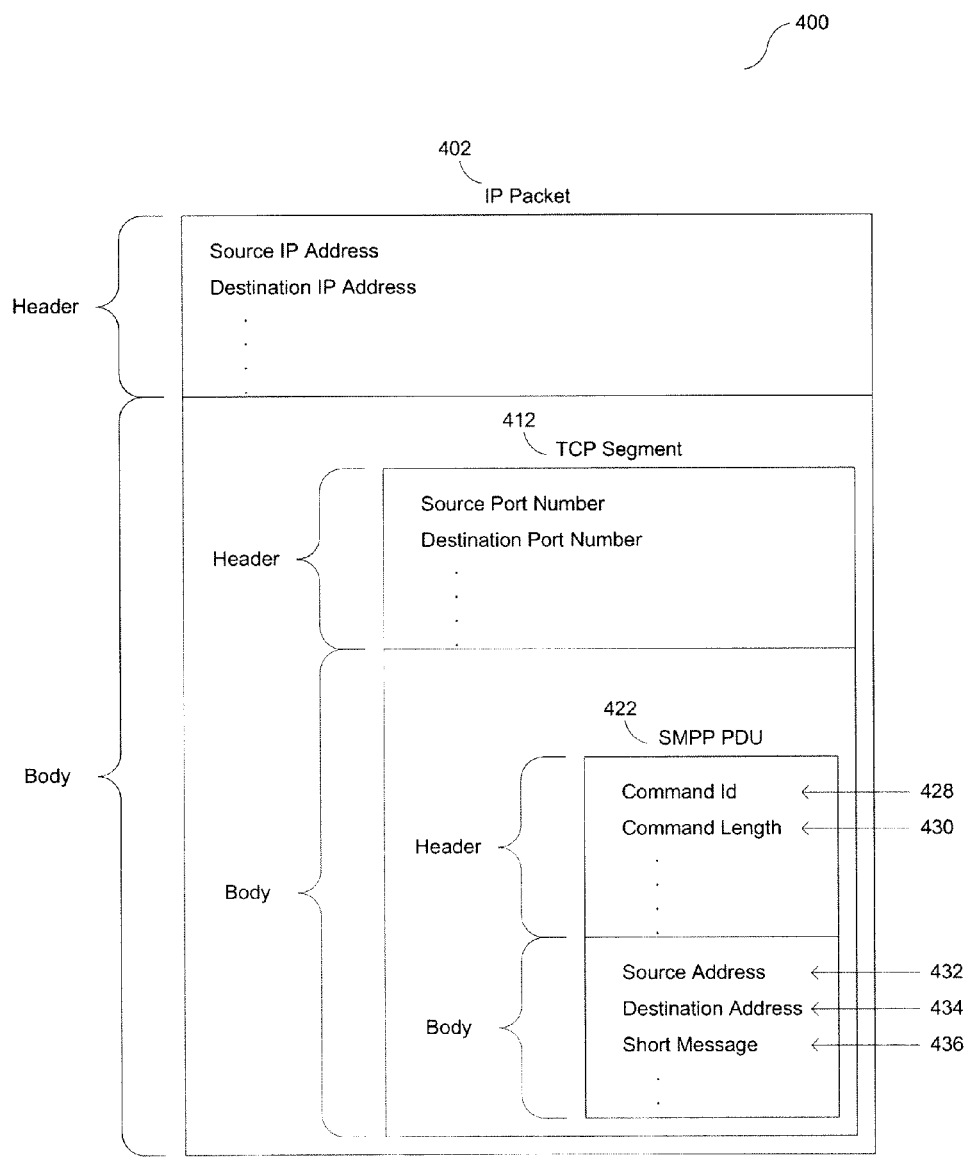
FIG. 4 illustrates aspects of an exemplary incoming SMS message received via an IP-based protocol.

For purposes of illustration, within an SMS context AIMS may support the receipt and dispatch of information through possibly inter alia Short Message Peer-to-Peer (SMPP) via Transmission Control Protocol (TCP)/IP and Mobile Application Part (MAP) via SS7. Under such a context:

1) FIG. 4 and reference numeral 400 depict an exemplary incoming SMS message received via for example SMPP with for example the data elements associated with the SMS message 428→436 encapsulated within a SMPP Protocol Data Unit (PDU 422) encapsulated within a TCP Segment 412 encapsulated within an IP Packet 402.

Figure 5:
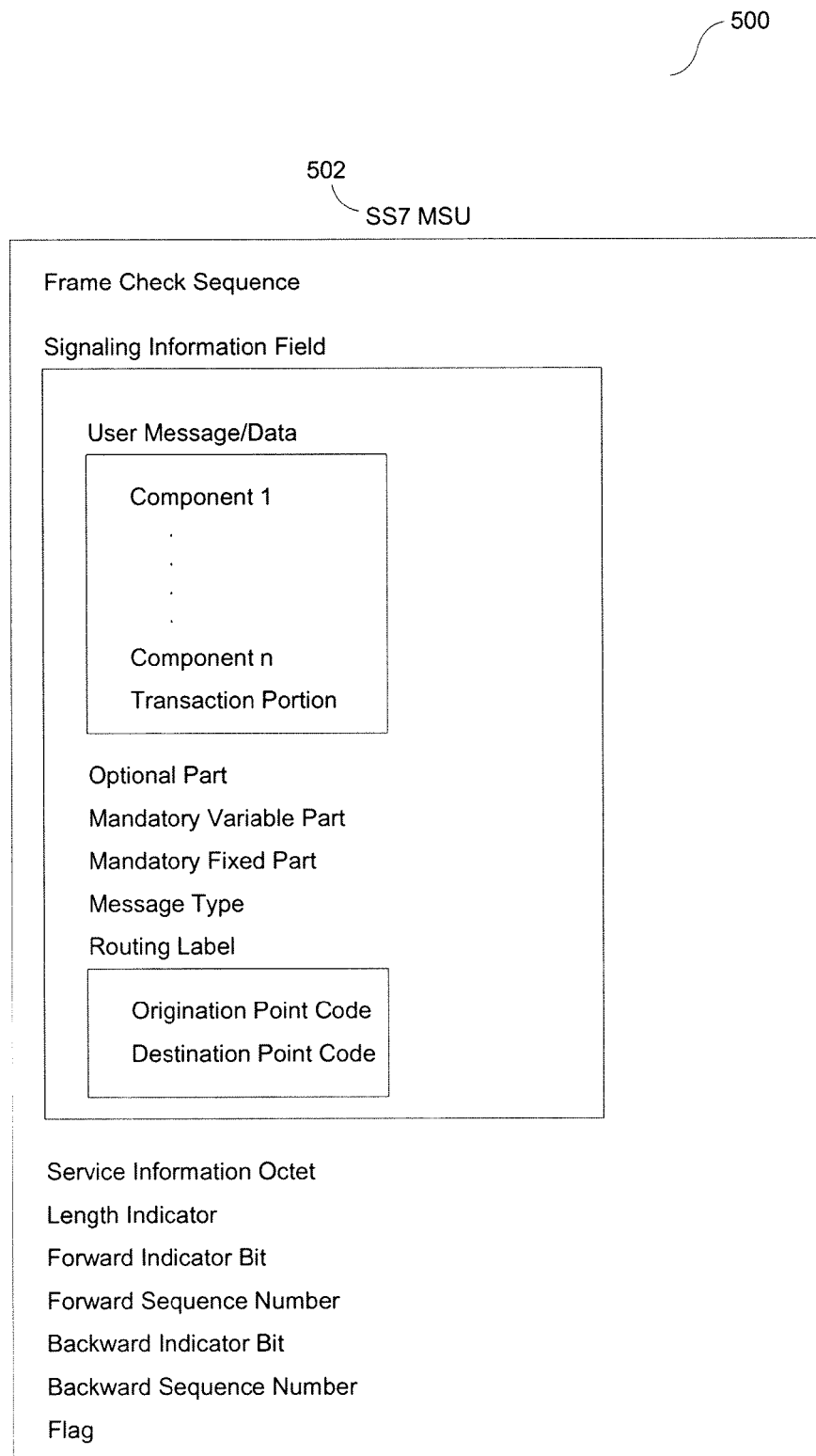
FIG. 5 illustrates aspects of an exemplary incoming SMS message received via Signaling System Number 7 (SS7).

2) FIG. 5 and reference numeral 500 depict an exemplary incoming SMS message received via for example MAP with for example the data elements associated with the SMS message encapsulated within a Message Signal Unit (MSU 502)

Figure 6:
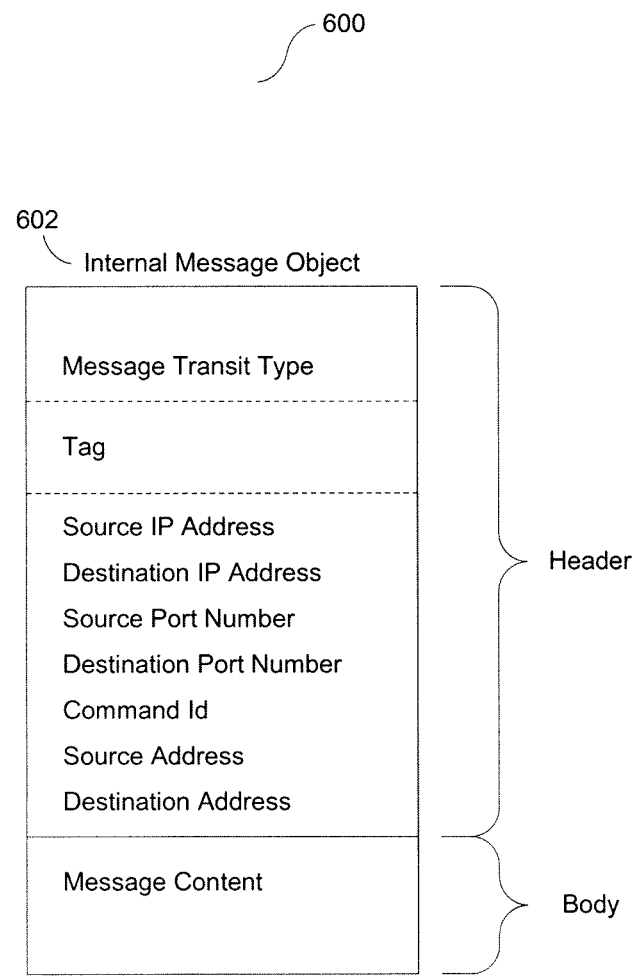
FIG. 6 illustrates aspects of a hypothetical Internal Message Object (IMO) that is possible in connection with an SMS message received via an IP-based protocol.
Figure 7:
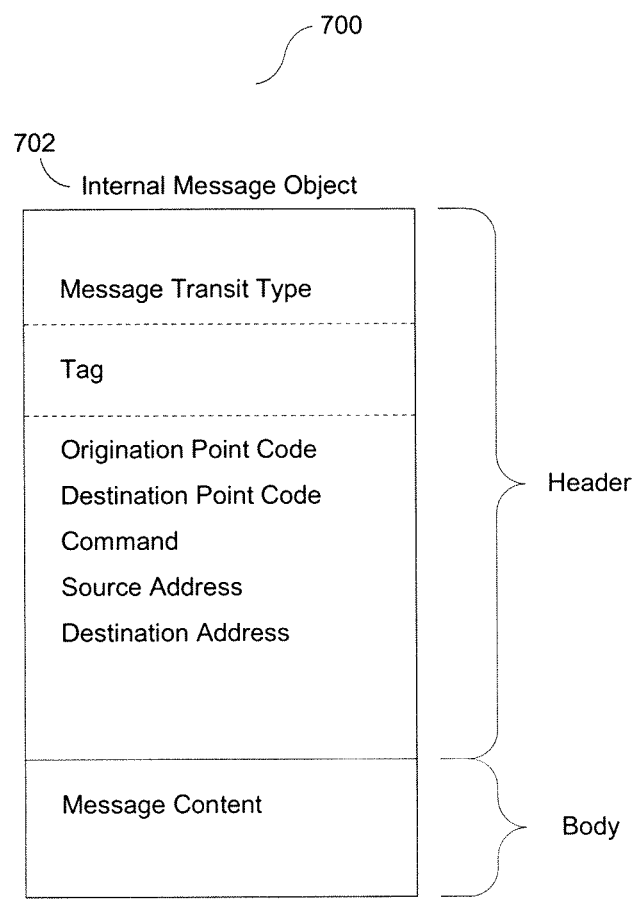
FIG. 7 illustrates aspects of a hypothetical IMO that is possible in connection with an SMS message received via SS7.

3) FIG. 6 and reference numeral 600 depict a hypothetical IMO 602 that is possible in support of an SMS message received via for example SMPP, and 4) FIG. 7 and reference numeral 700 depict a hypothetical IMO 702 that is possible in support of an SMS message received via for example MAP.

It will be readily apparent to one of ordinary skill in the art that numerous alternative arrangements, in connection with for example different contexts (such as inter alia MMS, VoIP, etc.) and different communication protocols, are easily possible.

AIMS includes among other elements a vertically and horizontally scalable Protocol Engine (PE) layer (see for example reference point 1220 in FIG. 12) through which information may be received and/or transmitted using any combination of one or more of the supported communication protocols including inter alia SS7, TCP/IP, User Datagram Protocol (UDP)/IP, Really Simple Syndication (RSS), SMPP, Simple Mail Transfer Protocol (SMTP), HyperText Transfer Protocol (HTTP), Extensible Messaging and Presence Protocol (XMPP), MM4, MM7, SIP, etc.

Figure 12:
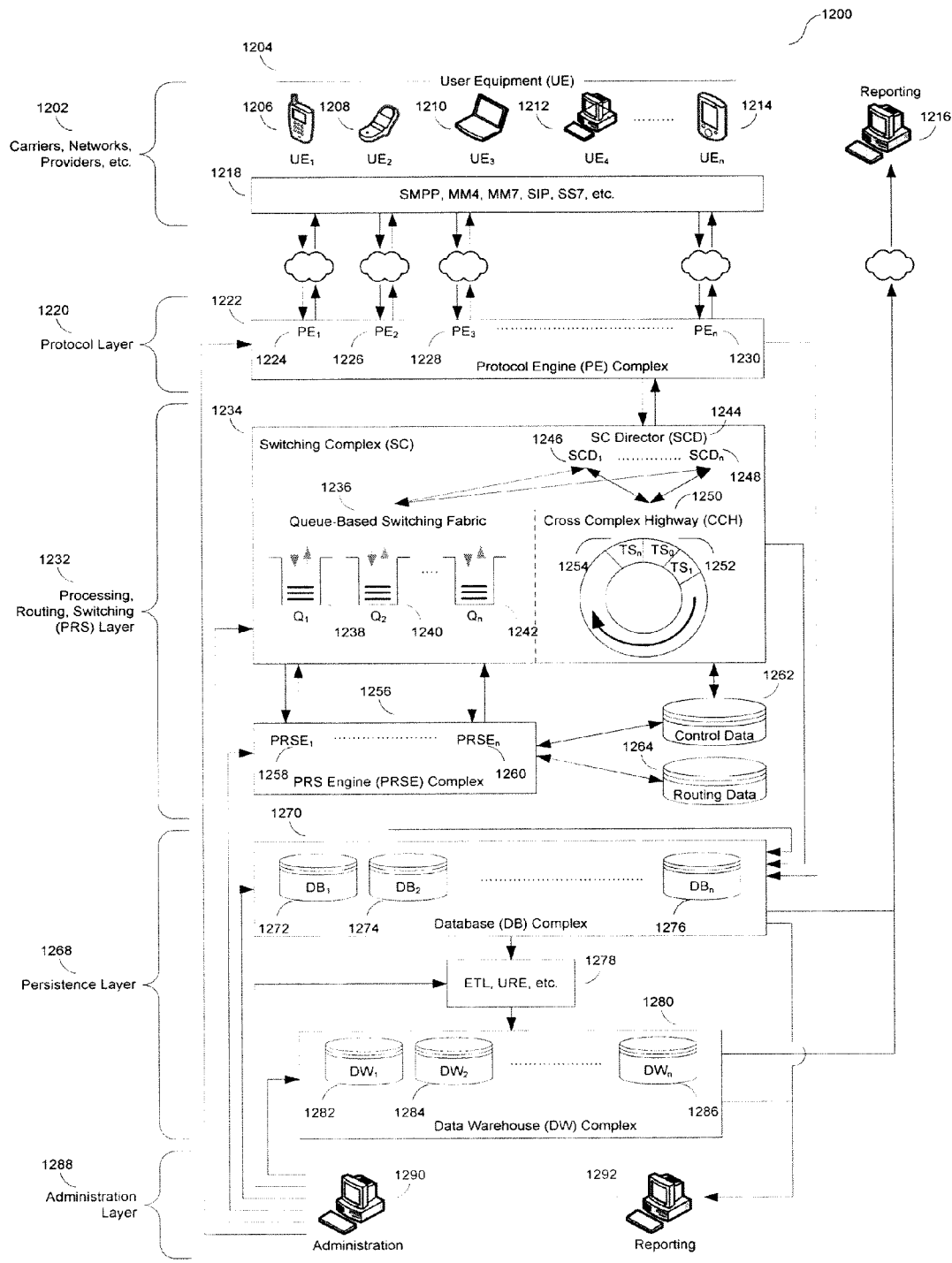
FIG. 12 depicts various of the elements that might be found in an exemplary AIMS environment.

A PE layer may house a dynamically updateable set of one or more PEs ($PE_1$ 1224→$PE_n$ 1230 in the FIG. 12). A PE may, for example, leverage a body of flexible, extensible, and dynamically updateable configuration information as it completes its tasks, including possibly inter alia:

A) Receiving incoming and sending outgoing traffic using any combination of the supported communication protocols, paradigms, etc.

B) Performing various extraction, validation, editing, formatting, conversion, etc. operations on the elements of an incoming and/or outgoing data stream—e.g., source address, destination address, encoding indicators or flags, payload or body, etc. The specific elements that were just described are illustrative only and it will be readily apparent to one of ordinary skill in the relevant art that numerous other elements are easily possible and indeed are fully within the scope of the present invention.

C) Encapsulating various elements of an incoming data stream within an IMO and/or un-encapsulating various elements of an outgoing data stream from an IMO.

The catalog of PE processing steps that was described above is illustrative only and it will be readily apparent to one of ordinary skill in the relevant art that numerous other processing steps are easily possible and indeed are fully within the scope of the present invention.

A PE layer may be quickly and easily scaled either vertically (to for example add additional capacity in response to increases in demand [e.g., message volume]), horizontally (to for example add support for a new application-level communication protocol), or both.

Figure 29:
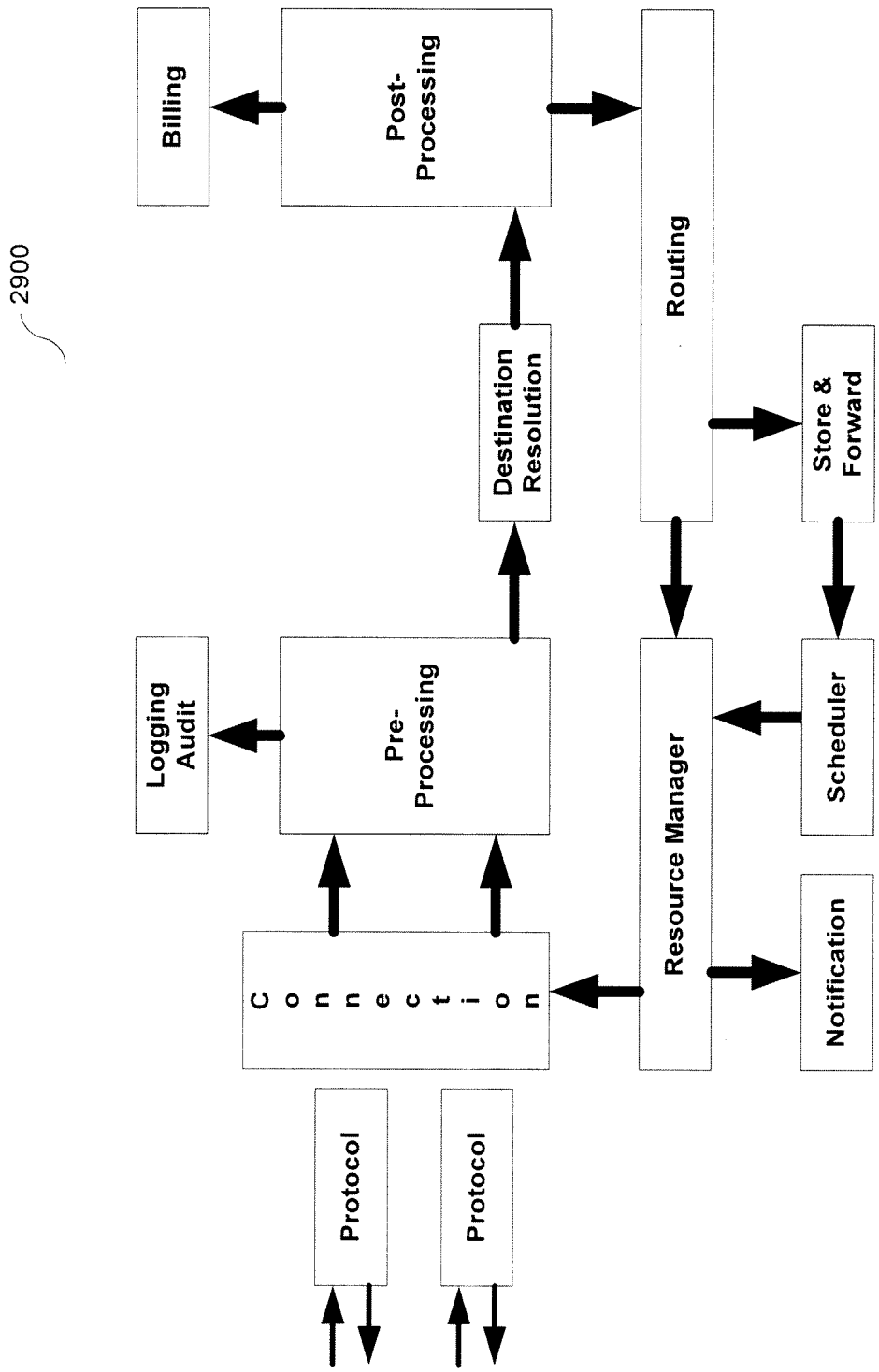
FIG. 29 depicts some of the logical elements of a processing and routing layer that may be possible through aspects of the present invention.

AIMS includes among other elements a flexible, extensible, and dynamically configurable WorkFlow-based PRS layer (see reference numeral 1232 in FIG. 12 along with FIG. 29 and reference numeral 2900). The WorkFlow elements of the PRS layer may be 'glued' together by a Message Routing Language (MRL, a full-featured scripting language that is based in part on the disclosures found in U.S. Pat. No. 6,735,586 entitled "System and Method for Dynamic Content Retrieval" and U.S. Pat. No. 7,240,067 entitled "System and Methodology for Extraction and Aggregation of Data from Dynamic Content") and may support among other things:

1) Processing. For example, the automatic and dynamic determination of the type of content (e.g., an SMS message, a VoIP data stream, etc.) in a received quanta of data and the preservation of same in for example an IMO; content transcoding operations; billing activities (including possibly pricing/rating events); data logging and collection in support of reporting; the generation of a Feature Tag; etc.

2) Routing. For example, the authoritative resolution of destination and/or source addresses; the examination of available routes and the application of various criteria (possibly including for example MS WD location information, least cost routing rules, MS profile and preference information, route loadings, aspects of a Feature Tag, attributes of a received quanta of data [e.g., data type, size, etc.], Quality of Service [QoS] constraints, billing and revenue constraints, etc.) to available routes to arrive at a specific route selection; etc.

3) Switching. For example, directing (switching) based on a selected route data to an appropriate outbound delivery channel (see for example reference number 1234 in FIG. 12).

The catalog of activities that was described above is illustrative only and it will be readily apparent to one of ordinary skill in the relevant art that numerous other activities are easily possible and indeed are fully within the scope of the present invention.

The billing activities within the Processing portion of a PRS layer may make use of a PS. A PS is a self-contained framework for capturing all of the particulars associated with cost and may include, possibly among other things, elements such as:

1) Descriptive Information. A range of descriptive or identifying information that may include, possibly inter alia, a unique identifier, a description (that may be displayed, that may be conveyed to an Operator for inclusion in a line-item on a MS monthly statement, etc.), effective dates/times, etc.

2) Interval. The starting point (e.g., the first of each month) and the duration (e.g., one calendar month) of the interval or cycle during which cost is accumulated.

3) Pre Amounts. Zero, one, or more fixed (e.g., $5.00) or variable (e.g., $0.05 times the number of items processed) amounts that contribute to an interval's overall or aggregate cost amount. A Pre Amount may be either a charge (a positive amount) or a discount (a negative amount) and may include, possibly inter alia, set-up fees, monthly service charges, etc.

4) Base Amount. The particulars that are applied to each event to rate, or determine the cost of, an event. Numerous plans or models are available to select from, including inter alia Static—Flat Rate—Basic (e.g., a single, fixed price), Static—Flat Rate—Tiered (e.g., price is derived from, inter alia, volume through defined thresholds or plateaus), etc. It is important to note that the preceding catalog of plans is illustrative only; it will be readily apparent to one of ordinary skill in the relevant art that other plans may be easily added.

5) Post Amounts. Zero, one, or more fixed (e.g., $1.00) or variable (e.g., 2% of the aggregate interval cost) amounts that contribute to an interval's overall or aggregate cost. A Post Amount may be either a charge (a positive amount) or a discount (a negative amount).

Figure 17:
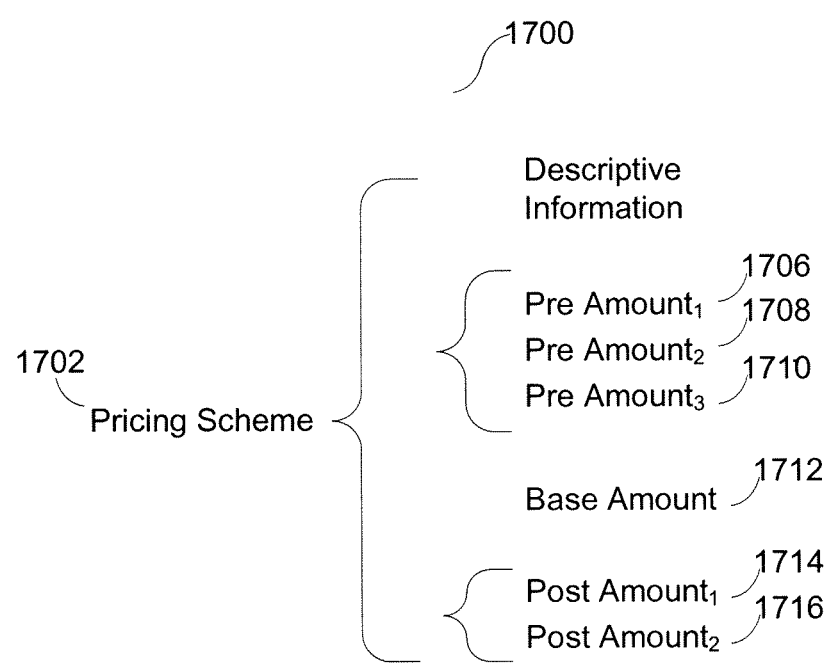
FIG. 17 illustrates an exemplary Pricing Scheme (PS).

For purposes of illustration, consider the hypothetical PS 1702 that is illustrated in FIG. 17 (and reference number 1700) which includes three (3) Pre Amounts (1706→1710), one (1) Base Amount 1712, and two (2) Post Amounts (1714→1716).

It should be noted that the specific PS that was just presented is illustrative only. It will be readily apparent to one or ordinary skill in the relevant art that the inclusion of different elements and/or alternative arrangements of the elements are easily possible.

One or more PSs may be associated with a Contract. A Contract may contain, possibly inter alia, descriptive information (e.g., a unique identifier, a description, etc.), all applicable terms and conditions (e.g., including support for one or more levels of optional taxation by, possibly inter alia, geography, national entity, etc.), etc.

Figure 18:
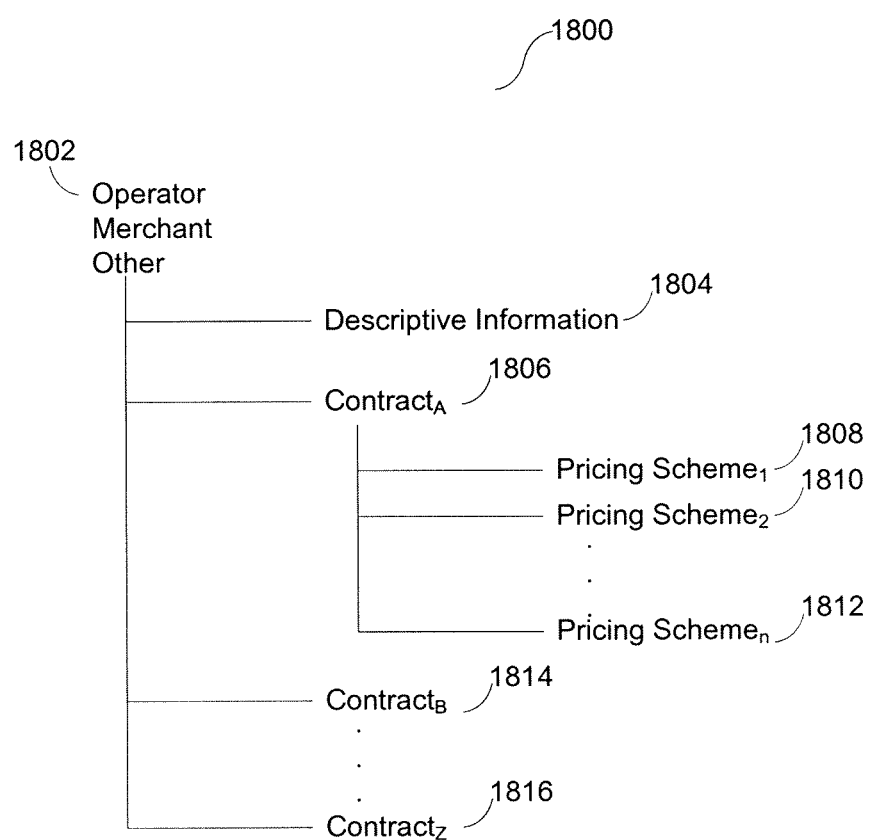
FIG. 18 illustrates an exemplary Contract Scheme (CS).

One or more Contracts may be associated with an Operator, Merchant, etc. through a CS. For purposes of illustration consider the hypothetical CS 1800 that is presented in FIG. 18. The depicted CS 1800 employs a flexible and extensible ontology that easily supports multiple contracts (1806, 1814, 1816) per Operator/Merchant/etc 1802. A contract may include a Pricing Scheme$_1$→Pricing Scheme$_n$ (1808, 1810, 1812). Descriptive material 1804 may also be associated with a given Operator/Merchant 1802.

Figure 19:
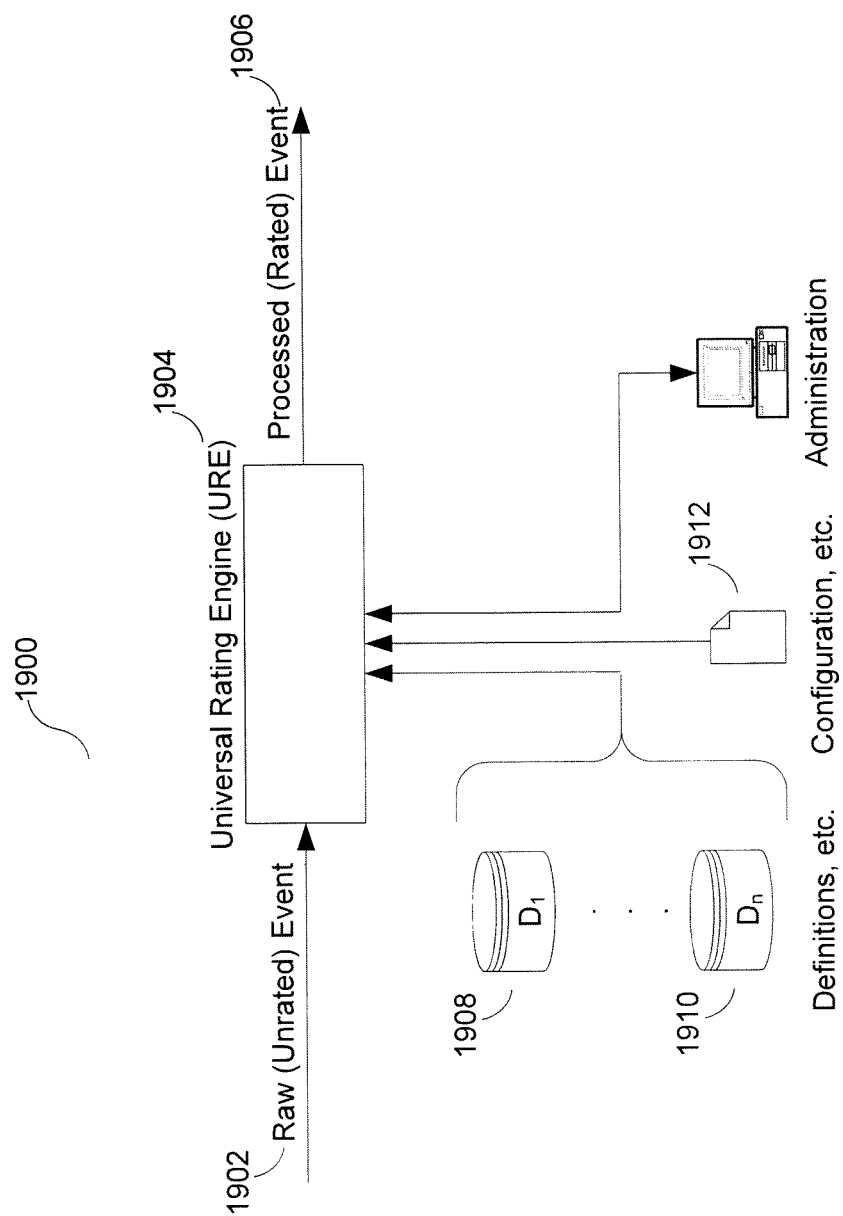
FIG. 19 depicts an exemplary Universal Rating Engine (URE).

The billing activities within the PRS layer may also make use of a URE. As illustrated in FIG. 19 and reference numeral 1900 a hypothetical URE 1904 may accept as input a raw (or unrated) event 1902; leverage a pool of flexible, extensible, and dynamically configurable definitional 1908→1910 and configuration 1912 information; and produce as output a processed (or rated) event 1906.

The different billing activities may yield among other things a billing transaction. A billing transaction may take any number of forms and may involve different external entities (e.g., a carrier billing system, a carrier billing system service bureau, a credit or debit card clearinghouse, a financial institution, etc.). A billing transaction may include, possibly inter alia:

1) The appearance of a line item charge on the bill or statement that a MS receives from her WC.

2) The charging of a credit card or the debiting of a debit card.

3) The (electronic, etc.) transfer of funds.

4) The generation of an invoice, statement, etc.

The Processing portion of a PRS layer may optionally generate, and possibly preserve in for example an IMO, one or more Feature Tags. A Feature Tag (see FIG. 8 and reference numeral 802) is effectively a compact digest of key data elements, thus providing inter alia a representation of or an alias for or a 'fingerprint' of those data elements, and may be based on possibly inter alia (a) attributes of a received quanta of data (e.g., data type, size, etc.), (b) routing and switching attributes (e.g., a selected route, the current loading on that route, QoS and other Service Level Agreement [SLA] requirements, etc.), (c) MS and/or WD characteristics, preferences, etc. (such as for example time-of-day, day-of-week, or other 'follow me' directives; defined contact or delivery windows and quiet [no contact] periods; physical location; etc.), (d) billing attributes, etc. Once generated, a Feature Tag may be quickly referenced by other elements of an AIMS environment as those elements complete their processing activities. (See for example U.S. Pat. No. 7,240,067 entitled "System and Methodology for Extraction and Aggregation of Data from Dynamic Content" and pending U.S. patent application Ser. No. 12/140,478 entitled "System and Method for Enhanced Message Routing" for a discussion of aspects of a Feature Tag). Feature Tags will be discussed further below.

Figure 15:
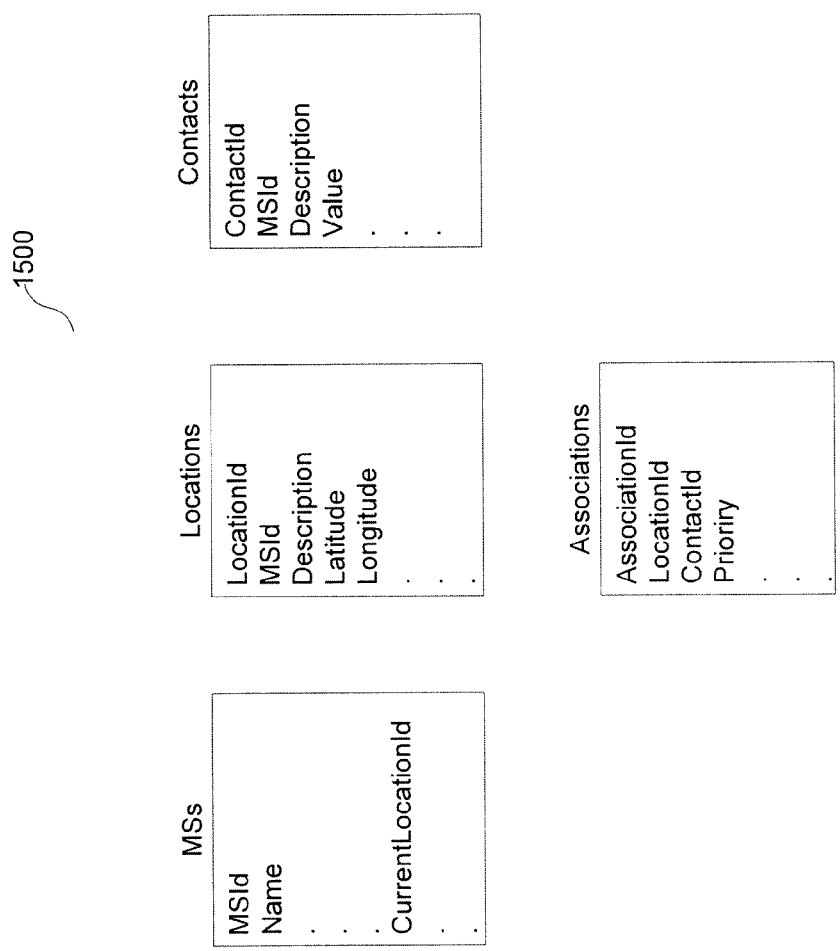
FIG. 15 illustrates elements of an exemplary data model that is supportive of various of the location aspects of the present invention.

The Routing portion of a PRS layer may support, and may include as it makes a route determination, among other things information on the current physical location of a MS' WD (as received for example from possibly inter alia the WC that services the WD). For purposes of illustration, a portion of an exemplary data model is illustrated in FIG. 15 and reference numeral 1500 and hypothetical contents of such a data model are presented in FIG. 16 and reference numeral 1600.

Figure 14:
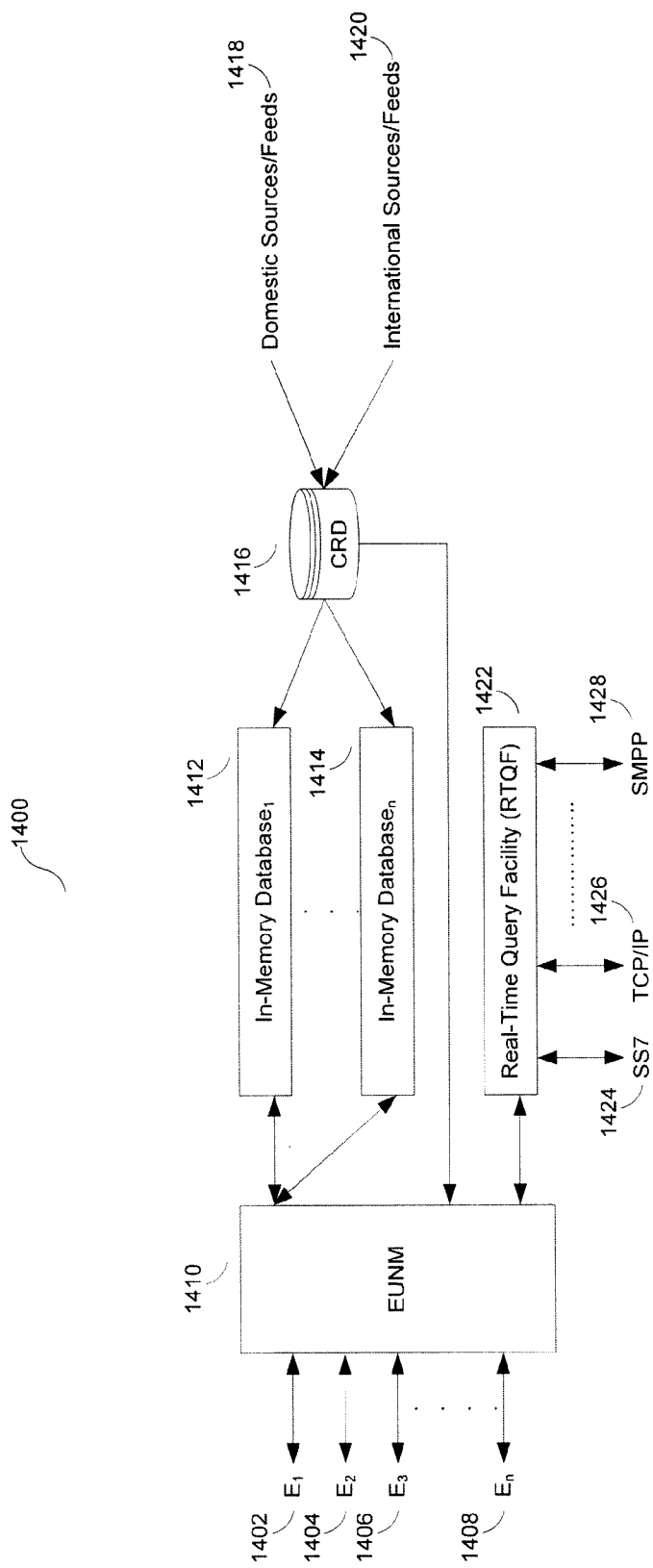
FIG. 14 illustrates aspects of an exemplary address resolution facility.

The Routing portion of a PRS layer may also leverage a comprehensive, flexible, scalable, etc. lookup facility (indicated, albeit at a very high level, as Routing Data 1264 in FIG. 12) to support, possibly inter alia, its routing operations. Such a lookup facility may provide authoritative answers to inquiries like "At this moment in time what carrier services the Telephone Number (TN) 1-703-555-1212?", "What entity services the SIP addresss sip:john.doe@bigcompany.com?", etc. Among other things such a lookup facility may address (1) the complexities that are associated with all of the different TN numbering plans, schemes, etc. that exist around the world; (2) the complexities that arise with worldwide Mobile Number Portability (MNP) regimes; etc. A more detailed depiction of such a lookup facility is presented in FIG. 14 and reference numeral 1400. Such a lookup facility may consist of, possibly inter alia:

A) An Electronic Numbering (ENUM) façade 1410 through which possibly inter alia various PRSEs ($E_1$ 1402→$E_n$ 1408 in FIG. 14) may connect, submit routing inquiries, receive routing responses, etc.

B) A dynamically updateable set of one or more In-Memory Databases (In-Memory Database$_1$ 1412→In-Memory Database$_n$ 1414 in the diagram) that optionally house or host selected data (including, possibly inter alia, data from a Composite Routing Database [CRD] 1416) to provide, as one example, optimal performance.

C) A Real-Time Query Facility (RTQF) 1422 through which inquiries may be dispatched real-time to authoritative bodies (such as, for example, TN assignment administrators) around the world. A RTQF 1422 may support multiple communication channels, paradigms, protocols, etc. (such as, possibly inter alia, SS7 1424, TCP/IP 1426, UDP/IP, SMPP 1428, etc.).

D) A CRD 1416 containing comprehensive routing information for, possibly inter alia, TNs within all of the different TN numbering plans, schemes, etc. that exist around the world. A CRD 1416 may receive updates (e.g., dynamically, on a scheduled basis, etc.) from any number of sources or feeds including, possibly inter alia, domestic 1418 (such as, for example, from a Local Exchange Routing Guide [LERG], from one or more Number Portability Administration Centers [NPACs], etc.) and international 1420 (such as, for example, from Hong Kong, from the United Kingdom, etc.).

A lookup facility as described above may support a wide range of address types including among others a TN (such as 703-555-1234), a Short Code (SC, such as 46625), a SIP Uniform Resource Identifier (URI, such as sip:mark@mydomain.com), a Tel URI (such as tel:+19257652333), a Uniform Resource Locator (URL), etc.

The Routing portion of a PRS layer may during various of its activities combine, compare, etc. one or more Feature Tags with inter alia a range of supporting data. For example, for each supported WC a number of delivery routes may be defined based on various criteria such as for example service (SMS, MMS, IMS, IM, etc.), WC preferences, infrastructure needs, etc. One or more Feature Tags may be combined, merged, etc. with such supporting data to possibly inter alia generate a routing plan and then select from a routing plan a specific delivery route.

Figure 30:
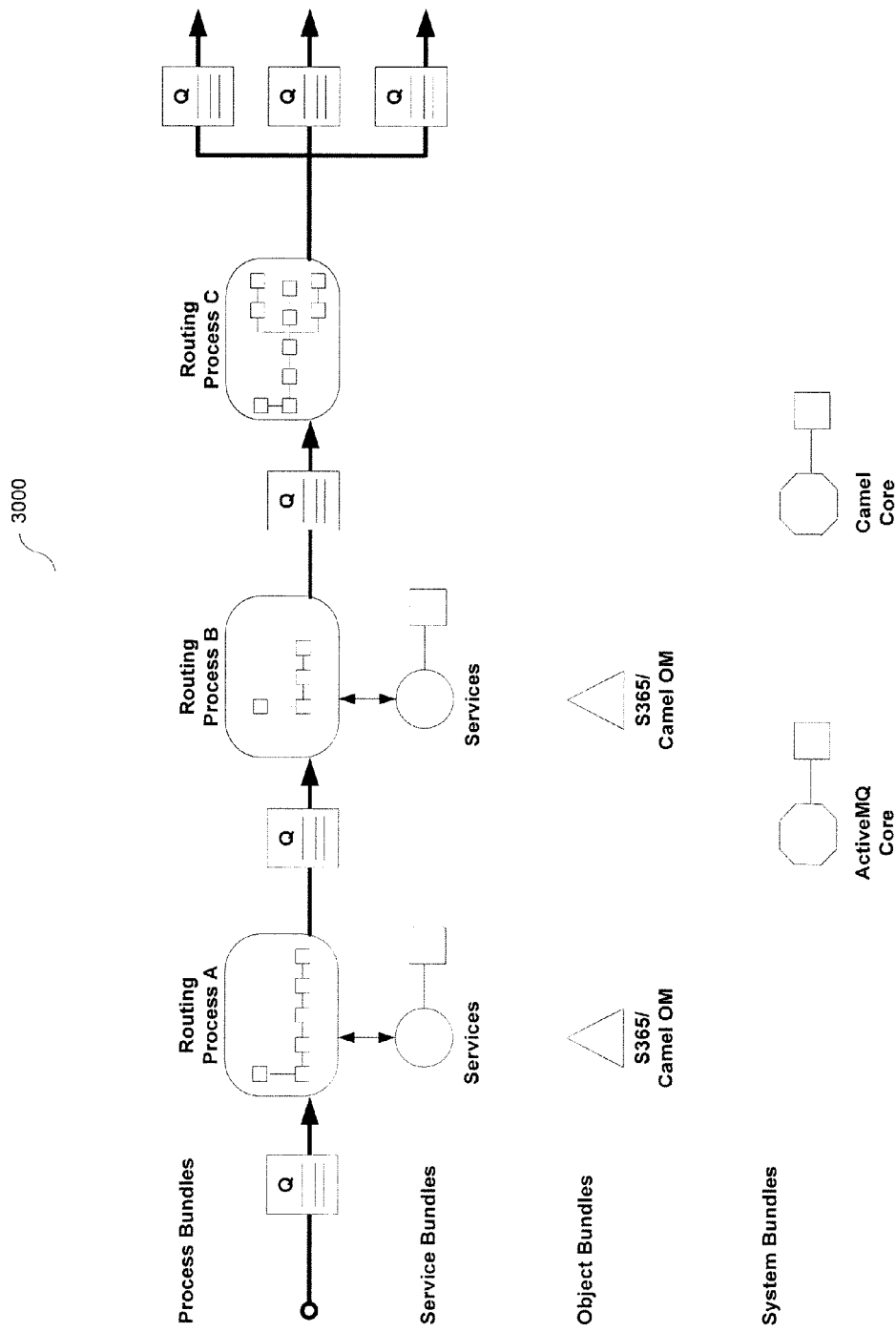
FIG. 30 illustrates how aspects of a routing layer might be physically realized under one particular implementation approach.

The Routing portion of a PRS layer may be physically realized through any number of technologies, arrangements, etc. As just one example, FIG. 30 and reference numeral 3000 illustrate how aspects of the Routing portion of a PRS layer might be realized using a Java-based OSGi dynamic component model (see for example paragraphs 56→61 above).

Figure 32:
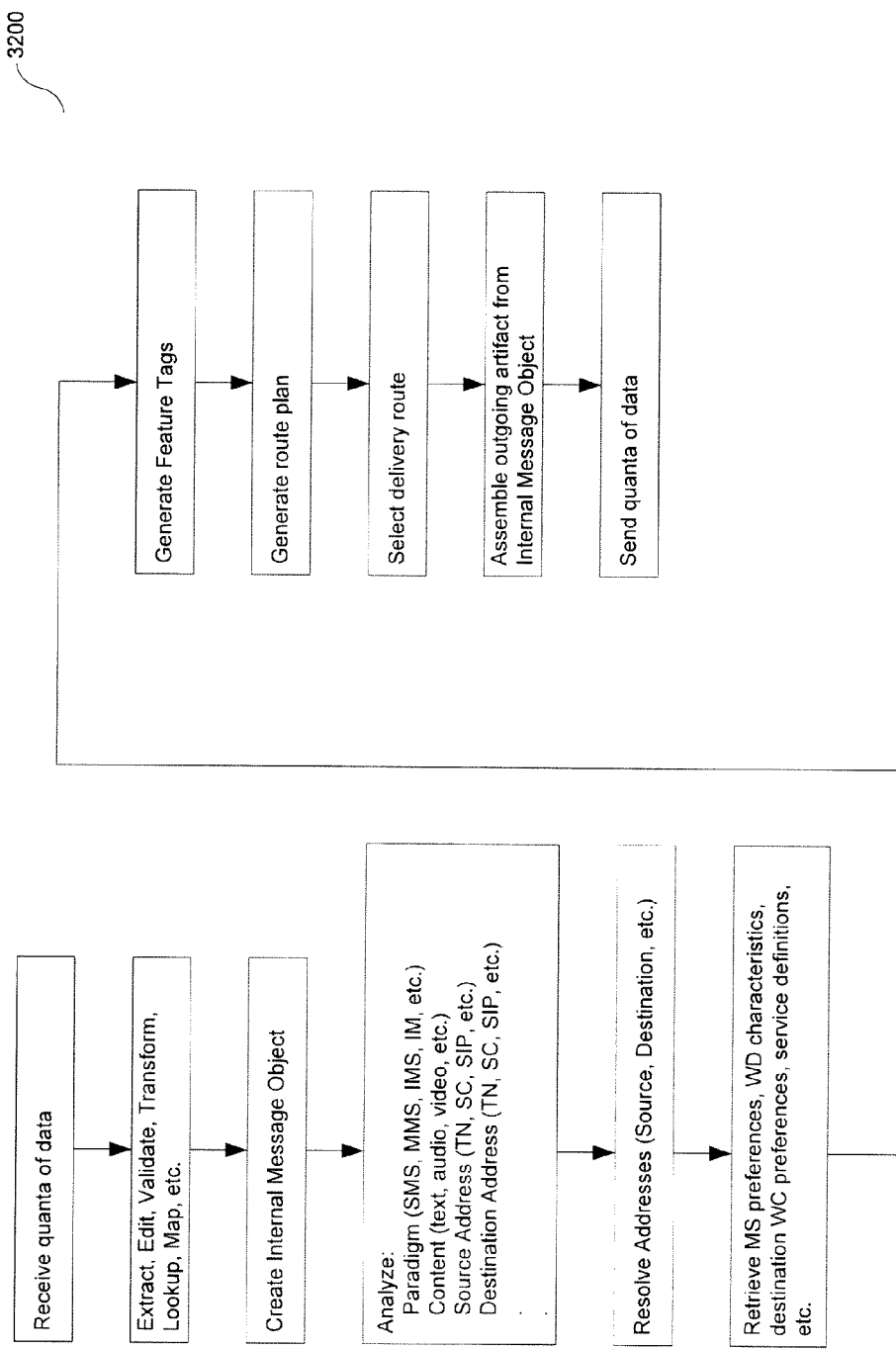
FIG. 32 depicts various of the activities that may take place under a Processing, Routing, and Switching (PRS) layer that is possible through aspects of the present invention.

For purposes of illustration, the flowchart that is presented in FIG. 32 and reference numeral 3200 depict various of the activities that may take place under a hypothetical PRS layer that is possible through aspects of the present invention.

The Databases 1262, 1264, 1272→1276, 1282→1286 that are depicted in FIG. 12 are a logical representation of the possibly multiple physical repositories that may be implemented to support, inter alia, configuration, routing, profile, monitoring, logging, reporting, etc. information. The physical repositories may be implemented through any combination of conventional Relational Database Management Systems (RDBMSs), through Object Database Management Systems (ODBMSs), through in-memory Database Management Systems (DBMSs), or through any other equivalent facilities.

The Administrator 1290 that is depicted in FIG. 12 provides management or administrative control over all of the different components of an environment through, as one example, a World Wide Web (WWW)-based interface. It will be readily apparent to one of ordinary skill in the relevant art that numerous other interfaces (e.g., a data feed, an Application Programming Interface [API], etc.) are easily possible.

As noted above, a Feature Tag is effectively a compact digest of key data elements, thus providing inter alia a representation of or an alias for or a 'fingerprint' of those data elements.

Feature Tags may follow an organized naming scheme and the naming scheme may incorporate an encoding model (e.g., the name 'SIP-PSI' might indicate a SIP message that has a Person endpoint, is of type SIP SIMPLE, and has an Indeterminate or unknown domain), may be organized in any number of ways (including for example alphabetically, nested, hierarchically, etc.), and may be searched or matched against in numerous ways (including for example sequentially, through wildcards, etc.).

For purposes of illustration, consider a simple Feature Tag model that is designed to support the processing, routing, etc. of SMS messages. Under such a model a hypothetical Feature Tag might be SP0TDTPMAAb and consist of:

1) A message type indicator. For example, 'S' for SMS.

2) A content type indicator. For example, 'P' for plain text, 'B' for binary data, etc.

3) A version number. For example, 0, 1, 2, etc. to allow for possibly inter alia future expansion, backwards compatibility, etc.

4) An originating address identifier. For example, 'T' for telephone number, 'S' for SC, etc.

5) An originating entity identifier. For example, 'U' for unknown, 'D' for a WC that is reachable directly, 'P' for a WC that is reachable indirectly through for example a peering partner, etc.

6) A destination address identifier. For example, 'T' for telephone number, 'S' for SC, etc.

7) A destination entity identifier. For example, 'U' for unknown, 'D' for a WC that is reachable directly, 'P' for a WC that is reachable indirectly through for example a peering partner, etc.

8) A content size indicator. For example, 'S' for small, 'M' for medium, for large, etc.

9) A spam assessment indicator. For example, 'A' for no spam found, 'Z' for spam found, etc.

10) An advertising assessment indicator. For example, 'A' for no advertising found, 'Z' for advertising found, etc.

11) A size indicator. For example, '9' for a total size of 9, 'b' for a total size of 11, 'h' for a total size of 17, etc.

It will be readily apparent to one of ordinary skill in the relevant art that numerous other arrangements are possible within the illustrative model that was presented above. As one example, the originating entity portion and the destination entity portion of the above Feature Tag model might be extended to include:

5a) A three-character originating entity, route, etc. identifier. For example, '03a,' 'F2P,' '3eZ,' etc.

7a) A three-character destination entity, route, etc. identifier. For example, '29g,' 'G2Q,' 'J8k,' etc.

where a hypothetical Feature Tag might be SP3TD3eZTPJ8kMAAh.

As another example, to support the processing, routing, etc. of MMS messages the message type indicator could be extended to include 'M' for MMS; the content type indicator could be extended to include different media types (such as 'I' for image, 'V' for video, 'A' for audio, etc.); the originating address identifier and the destination address identifier could be extended to include different address types (such as 'E' for E-Mail, etc.); etc.

Figure 31:
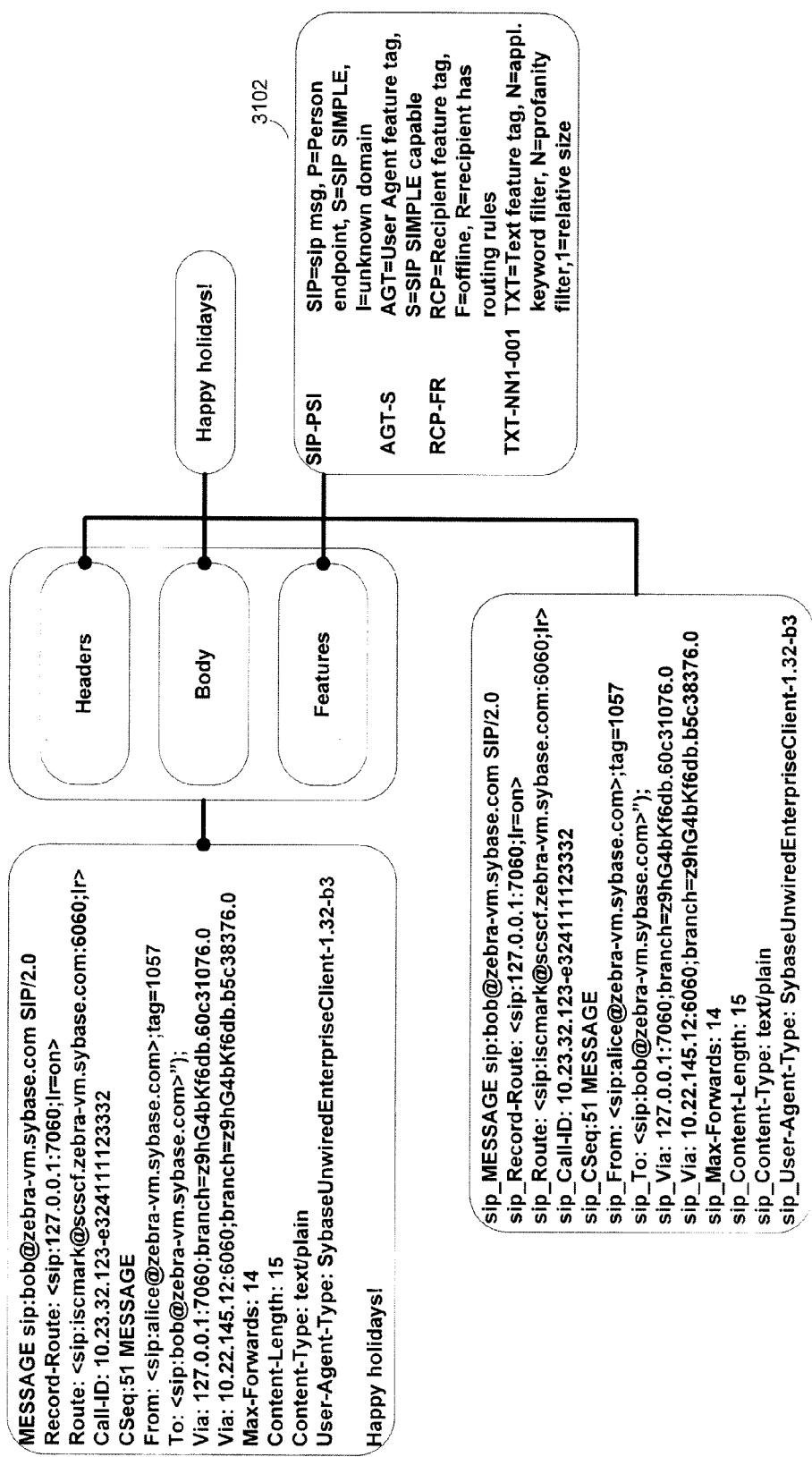
FIG. 31 depicts aspects of an exemplary IMO.

FIG. 31 depicts aspects of several illustrative Feature Tags (e.g., SIP-PSI→AGT-S→RCP-FR→TXT-NN1-001, see reference numeral 3102) under another Feature Tag model that is possible through aspects of the present invention.

It will be readily apparent to one of ordinary skill in the relevant art that numerous other Feature Tag models, beyond the illustrative models that were presented above, are easily possible.

As noted previously, a collection of Feature Tags may optionally be organized in any number of ways including inter alia hierarchically, in a nested fashion, alphabetically, by size, etc.

Aspects of the processing, searching, matching, etc. of Feature Tags may optionally employ wild card characters. For purposes of illustration, under the illustrative Feature Tag model that was presented above with the hypothetical Feature Tag SP0TDTPMAAb any number of searches, comparisons, etc. may be quickly completed using wild cards:

1) SP*. Just plain text SMS messages.
2) S?0*. Just version 0 Feature Tags.
3) S???D?D*. Just SMS messages that were received from a WC that is reachable directly and that were delivered to a WC that is reachable directly.
4) Etc.

It will be readily apparent to one of ordinary skill in the relevant art that numerous other Feature Tag processing, searching, matching, etc. mechanisms are easily possible including inter alia regular expressions, formal grammars, etc.

Beyond the Processing portion of a PRS layer, the other portions of a PRS layer (i.e., the Routing portion and the Switching portion) may as they complete various of their operations update one or more existing Feature Tags and/or generate, and optionally preserve, one or more new Feature Tags. For example, as the Routing portion of a PRS layer completes an address resolution operation it may update one or more existing Feature Tags and/or generate one or more new Feature Tags.

Figure 33:
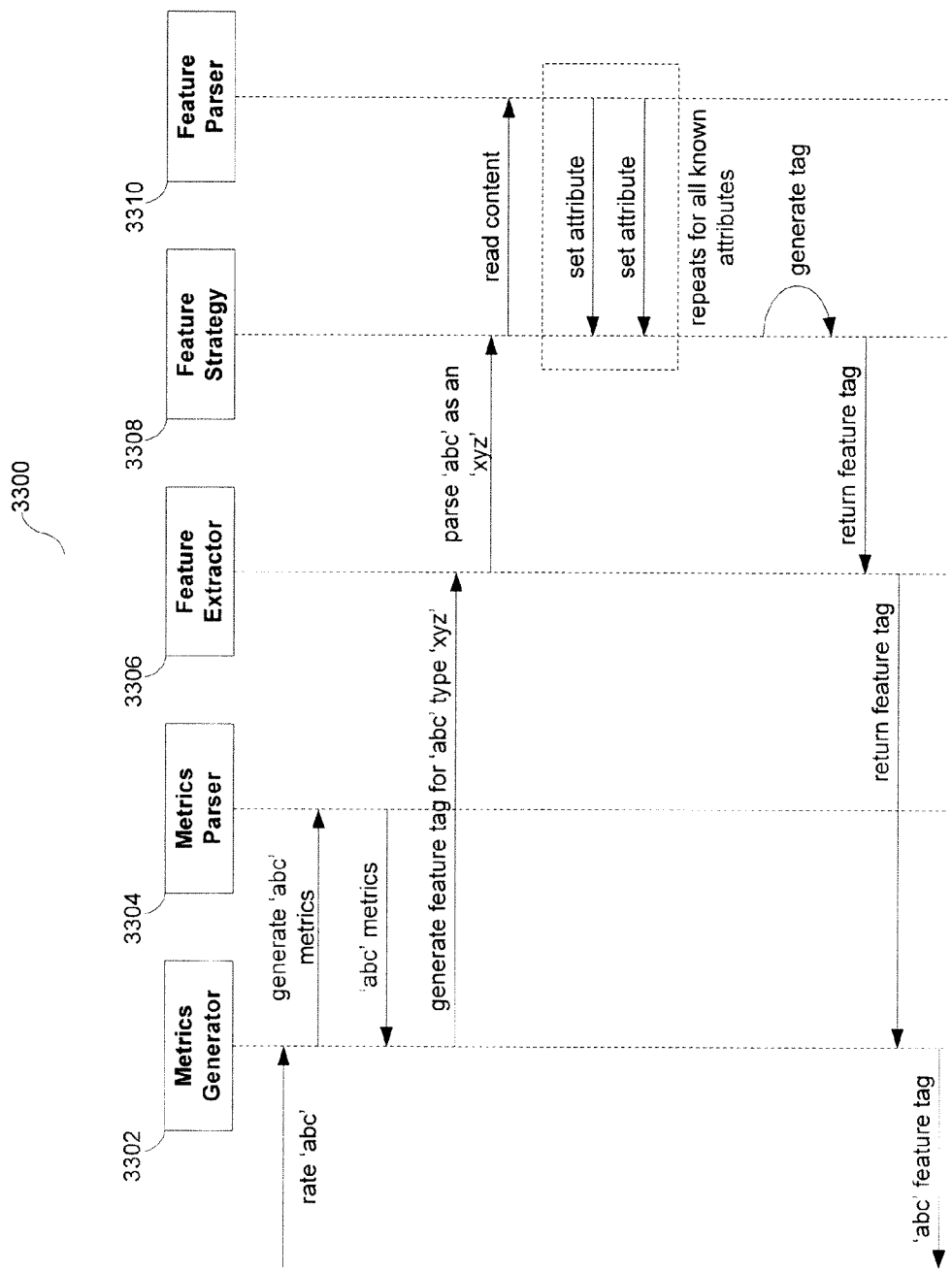
FIG. 33 depicts various of the interactions that may be possible during the generation of a Feature Tag under one particular implementation of aspects of the present invention.

For purposes of illustration, FIG. 33 and reference numeral 3300 depict various of the interactions that might take place during the generation of a Feature Tag under one particular implementation of aspects of the present invention. For example:

1) A Metrics Generator 3302 may identify key constructs, attributes, etc. from a supplied piece of content. Multiple Metrics Generator bodies may be defined, one for (i.e., applicable to) a particular type of content.

2) A Metrics Parser 3304 may analyze different constructs, attributes, etc. to identify inter alia the 'type' (e.g., SMS text, etc.) of a piece of content, the 'size' of a piece of content, etc. A Metrics Generator 3302 may optionally act on the output of (the results returned by) a Metrics Parser 3304 to complete further of its processing activities.

3) A Feature Extractor 3306 may generate one or more defined features.

4) A Feature Strategy 3308 may leverage a Feature Parser 3310 to process, rate, etc. each of the defined features.

5) A Feature Parser 3310 may iterate through, and evaluate, a particular portion of the structure of a piece of content.

An AIMS environment may maintain one or more repositories (e.g., 1272→1276 and 1282→1286 in FIG. 12) into which selected details of all administrative, analytical, processing, routing, etc. activities; Transaction Detail Records (TDRs); the results of Extraction-Transformation-Load (ETL) operations; etc. may be recorded. Among other things, such repositories may be used to support:

1) Scheduled (e.g., daily, weekly, etc.) and/or on-demand reporting with report results delivered through SMS, MMS, etc. messages; through E-Mail; through a WWW-based facility; etc.

2) Scheduled and/or on-demand data mining initiatives (possibly leveraging or otherwise incorporating one or more external data sources) with the results of same presented through Geographic Information Systems (GISs), visualization, etc. facilities and delivered through SMS, MMS, etc. messages; through E-Mail; through a WWW-based facility; etc.

FIGS. 26a through 26d illustrate several of the exchanges or interactions that may be possible within an AIMS-based environment in connection with the processing, delivery, of an SMS message. In the figures the designation 'MM Server' indicates a protocol handling layer (such as element 1220 in FIG. 12), the designation 'OSGi Server' indicates a PRS layer (such as element 1232 in FIG. 12), and the designation 'SMS MC' indicates application logic for common Short Message Service Center (SMSC) functions.

FIGS. 27a through 27e illustrate several of the exchanges or interactions that may be possible within an AIMS-based environment in connection with the processing, delivery, etc. of a MMS message. In the figures the designation 'MM Server' indicates a protocol handling layer (such as element 1220 in FIG. 12), the designation 'OSGi Server' indicates a PRS layer (such as element 1232 in FIG. 12), and the designation 'MMS MC' indicates application logic for common Multimedia Message Service Center (MMSC) functions.

Figure 28:
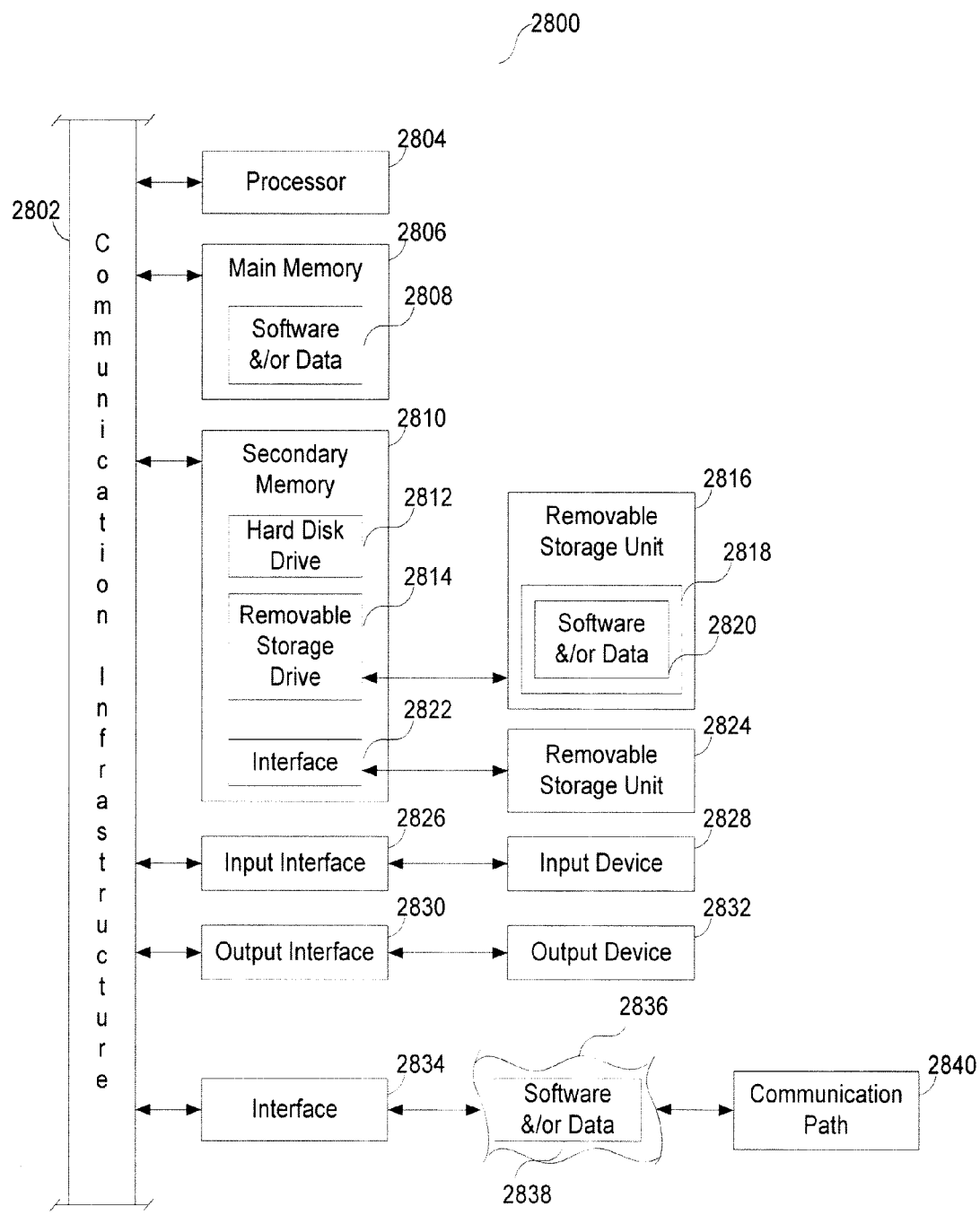
FIG. 28 depicts an exemplary computer system through which embodiments of aspects of the present invention may be implemented.

Various aspects of the present invention can be implemented by software, firmware, hardware, or any combination thereof. FIG. 28 illustrates an example computer system 2800 in which the present invention, or portions thereof, such as described in the paragraphs above can be implemented as computer-readable code. Various embodiments of the invention are described in terms of this example computer system 2800. After reading this description, it will become apparent to a person skilled in the relevant art how to implement the invention using other computer systems and/or computer architectures.

Computer system 2800 includes one or more processors, such as processor 2804. Processor 2804 can be a special purpose processor or a general purpose processor. Processor 2804 is connected to a communication infrastructure 2802 (for example, a bus or a network).

Computer system 2800 also includes a main memory 2806, preferably Random Access Memory (RAM), containing possibly inter alia computer software and/or data 2808.

Computer system 2800 may also include a secondary memory 2810. Secondary memory 2810 may include, for example, a hard disk drive 2812, a removable storage drive 2814, a memory stick, etc. A removable storage drive 2814 may comprise a floppy disk drive, a magnetic tape drive, an optical disk drive, a flash memory, or the like. A removable storage drive 2814 reads from and/or writes to a removable storage unit 2816 in a well known manner. A removable storage unit 2816 may comprise a floppy disk, magnetic tape, optical disk, etc. which is read by and written to by removable storage drive 2814. As will be appreciated by persons skilled in the relevant art(s) removable storage unit 2816 includes a computer usable storage medium 2818 having stored therein possibly inter alia computer software and/or data 2820.

In alternative implementations, secondary memory 2810 may include other similar means for allowing computer programs or other instructions to be loaded into computer system 2800. Such means may include, for example, a removable storage unit 2824 and an interface 2822. Examples of such means may include a program cartridge and cartridge interface (such as that found in video game devices), a removable memory chip (such as an Erasable Programmable Read-Only Memory [EPROM], or Programmable Read-Only Memory [PROM]) and associated socket, and other removable storage units 2824 and interfaces 2822 which allow software and data to be transferred from the removable storage unit 2824 to computer system 2800.

Computer system 2800 may also include an input interface 2826 and a range of input devices 2828 such as, possibly inter alia, a keyboard, a mouse, etc.

Computer system 2800 may also include an output interface 2830 and a range of output devices 2832 such as, possibly inter alia, a display, one or more speakers, etc.

Computer system 2800 may also include a communications interface 2834. Communications interface 2834 allows software and/or data 2838 to be transferred between computer system 2800 and external devices. Communications interface 2834 may include a modem, a network interface (such as an Ethernet card), a communications port, a Personal Computer Memory Card International Association (PCMCIA) slot and card, or the like. Software and/or data 2838 transferred via communications interface 2834 are in the form of signals 2836 which may be electronic, electromagnetic, optical, or other signals capable of being received by communications interface 2834. These signals 2836 are provided to communications interface 2834 via a communications path 2840. Communications path 2840 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 2816, removable storage unit 2824, and a hard disk installed in hard disk drive 2812. Computer program medium and computer usable medium can also refer to memories, such as main memory 2806 and secondary memory 2810, which can be memory semiconductors (e.g. Dynamic Random Access Memory [DRAM] elements, etc.). These computer program products are means for providing software to computer system 2800.

Computer programs (also called computer control logic) are stored in main memory 2806 and/or secondary memory 2810. Computer programs may also be received via communications interface 2834. Such computer programs, when executed, enable computer system 2800 to implement the present invention as discussed herein. In particular, the computer programs, when executed, enable processor 704 to implement the processes of aspects of the present invention, such as the steps discussed in the above paragraphs. Accordingly, such computer programs represent controllers of the computer system 2800. Where the invention is implemented using software, the software may be stored in a computer program product and loaded into computer system 2800 using removable storage drive 2814, interface 2822, hard drive 2812 or communications interface 2834.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory [CD-ROM] disks, Zip disks, tapes, magnetic storage devices, optical storage devices, Microelectromechanical Systems [MEMS], nanotechnological storage device, etc.), and communication mediums (e.g., wired and wireless communications networks, local area networks, wide area networks, intranets, etc.).

It is important to note that the hypothetical examples that were presented above, which were described in the narrative and which were illustrated in the accompanying figures, are exemplary only. They are not intended to be exhaustive or to limit the invention to the specific forms disclosed. It will be readily apparent to one of ordinary skill in the relevant art that numerous alternatives to the presented examples are easily possible and, indeed, are fully within the scope of the present invention.

The following list defines acronyms as used in this disclosure.

| Acronym | Meaning |
| --- | --- |
| A2P | Application-to-Peer |
| AIMS | Advanced IP Messaging Server |
| API | Application Programming Interface |
| AS | Application Server |
| CD-ROM | Compact Disc Read-Only Memory |
| CP | Content Provider |
| CRD | Composite Routing Database |
| CS | Contract Scheme |
| CSCF | Call Session Control Function |
| DBMS | Database Management System |
| DRAM | Dynamic Random Access Memory |
| DSL | Digital Subscriber Line |
| E-Mail | Electronic Mail |
| ENUM | Electronic Numbering |
| EPROM | Erasable Programmable Read-Only Memory |
| ETL | Extraction-Transformation-Load |
| GIS | Geographic Information System |
| HSS | Home Subscriber Server |
| HTTP | HyperText Transfer Protocol |
| IM | Instant Messaging |
| IMO | Internal Message Object |
| IMS | IP Multimedia Subsystem |
| IP | Internet Protocol |
| JMS | Java Message Service |
| LERG | Local Exchange Routing Guide |
| MAP | Mobile Application Part |
| MEMS | Microelectromechanical Systems |
| MG | Media Gateway |
| MH | Message Highway |
| MICV | Messaging Inter-Carrier Vendor |
| MMS | Multimedia Message Service |
| MMSC | Multimedia Message Service Center |
| MNP | Mobile Number Portability |
| MPE | Message Processing Engine |
| MRL | Message Routing Language |

-continued

| Acronym | Meaning |
|---|---|
| MS | Mobile Subscriber |
| MSU | Message Signal Unit |
| NPAC | Number Portability Administration Center |
| ODBMS | Object Database Management System |
| P2P | Peer-to-Peer |
| PCMCIA | Personal Computer Memory Card International Association |
| PDA | Personal Digital Assistant |
| PDU | Protocol Data Unit |
| PE | Protocol Engine |
| PLMN | Public Land Mobile Network |
| PROM | Programmable Read-Only Memory |
| PRS | Processing, Routing, and Switching |
| PS | Pricing Scheme |
| PSTN | Public Switched Telephone Network |
| QoS | Quality of Service |
| RAM | Random Access Memory |
| RDBMS | Relational Database Management System |
| RF | Radio Frequency |
| RSS | Really Simple Syndication |
| RTQF | Real-Time Query Facility |
| SC | Short Code |
| SIP | Session Initiation Protocol |
| SLA | Service Level Agreement |
| SMPP | Short Message Peer-to-Peer |
| SMS | Short Message Service |
| SMSC | Short Message Service Center |
| SMTP | Simple Mail Transfer Protocol |
| SP | Service Provider |
| SS7 | Signaling System Seven |
| 3P | Third Party |
| TCP | Transmission Control Protocol |
| TDR | Transaction Detail Record |
| TN | Telephone Number |
| UDP | User Datagram Protocol |
| URE | Universal Rating Engine |
| URI | Uniform Resource Identifier |
| URL | Uniform Resource Locator |
| VoIP | Voice Over IP |
| WAP | Wireless Application Protocol |
| WC | Wireless Carrier |
| WD | Wireless Device |
| WWW | World-Wide Web |
| XMPP | Extensible Messaging and Presence Protocol |

What is claimed is:

1. A server-based method for directing a quanta of data towards a wireless device of a mobile subscriber, the server-based method comprising:
   receiving the quanta of data at a gateway, the quanta of data comprising an originating indicia, a destination indicia, and a content; and
   performing a plurality of processing steps including at least:
   (a) creating an Internal Message Object (IMO) from aspects of the quanta of data,
   (b) characterizing aspects of the quanta of data including at least (i) a type and (ii) a size,
   (c) generating a Feature Tag based on (i) the type, (ii) the size, (iii) a version number, (iv) the originating indicia including an originating entity identifier other than an address, and (v) the destination indicia including a destination entity identifier other than an address, wherein the Feature Tag is an encoding of the type of the quanta of data, the size of the quanta of data, the version number, the originating indicia, the originating entity identifier, the destination indicia and the destination entity identifier, and wherein the originating entity identifier identifies a device that originated the quanta of data and the destination entity identifier identifies the wireless device that is designated by the device to receive the quanta of data, and
   (d) preserving the Feature Tag in the IMO for reference by other elements during processing of the IMO.

2. The server-based method of claim 1 wherein the step of generating the Feature Tag employs one or more of (a) a Metrics Generator, (b) a Metrics Parser, (c) a Feature Extractor, (d) a Feature Strategy, and (e) a Feature Parser.

3. The server-based method of claim 1 wherein a plurality of Feature Tags are generated and the plurality of Feature Tags follow an organized naming scheme.

4. The server-based method of claim 3 wherein the organized naming scheme employs an encoding model.

5. The server-based method of claim 1 wherein a plurality of Feature Tags are generated and organized in either (a) an alphabetical fashion, (b) a nested fashion, or (c) a hierarchical fashion.

6. The server-based method of claim 1 wherein the Feature Tag is searchable.

7. The server-based method of claim 6 wherein searching is by wildcard.

8. The server-based method of claim 1 wherein the originating entity identifier indicates whether an originating entity is one of unknown, reachable directly or reachable via a peering partner.

9. The server-based method of claim 1 wherein the destination entity identifier indicates whether a destination entity is one of unknown, reachable directly or reachable via a peering partner.

10. A processor-based system on a server configured to direct a quanta of data towards a wireless device of a mobile subscriber, the processor-based system comprising:
    a gateway configured to receive the quanta of data, the quanta of data comprising an originating indicia, a destination indicia, and a content; and
    workflow modules configured to perform a plurality of processing steps including at least:
    (a) create an Internal Message Object (IMO) from at least aspects of the quanta of data,
    (b) characterize aspects of the quanta of data including at least (i) a type and (ii) a size,
    (c) generate a Feature Tag based on (i) the type, (ii) the size, (iii) a version number, (iv) the originating indicia including an originating entity identifier other than an address, and (v) the destination indicia including a destination entity identifier other than an address, wherein the Feature Tag is an encoding of the type of the quanta of data, the size of the quanta of data, the version number, the originating indicia, the originating entity identifier, the destination indicia and the destination entity identifier, and wherein the originating entity identifier identifies a device that originated the quanta of data and the destination entity identifier identifies the wireless device that is designated by the device to receive the quanta of data, and
    (d) preserve the Feature Tag in the IMO for reference by other elements during processing of the IMO.

11. The processor-based system of claim 10 wherein generating the Feature Tag employs one or more of (a) a Metrics Generator, (b) a Metrics Parser, (c) a Feature Extractor, (d) a Feature Strategy, and (e) a Feature Parser.

12. The processor-based system of claim 10 wherein the a plurality of Feature Tags are generated and the plurality of Feature Tags follow an organized naming scheme.

13. The processor-based system of claim 12 wherein the organized naming scheme employs an encoding model.

14. The processor-based system of claim 10 wherein a plurality of Feature Tags are generated and organized in either (a) an alphabetical fashion, (b) a nested fashion, or (c) a hierarchical fashion.

15. The processor-based system of claim 10 wherein the Feature Tag is searchable.

16. The processor-based system of claim 15 wherein searching is by wildcard.

17. The processor-based system of claim 10 wherein the originating entity identifier indicates whether an originating entity is one of unknown, reachable directly or reachable via a peering partner.

18. The server-based method of claim 10 wherein the destination entity identifier indicates whether a destination entity is one of unknown, reachable directly or reachable via a peering partner.

* * * * *